(12) United States Patent
Tantsura et al.

(10) Patent No.: US 11,038,791 B2
(45) Date of Patent: Jun. 15, 2021

(54) TECHNIQUES FOR EXPOSING MAXIMUM NODE AND/OR LINK SEGMENT IDENTIFIER DEPTH UTILIZING OSPF

(71) Applicant: Telefonaktiebolaget LM Ericsson (publ), Stockholm (SE)

(72) Inventors: Evgeny Tantsura, Palo Alto, CA (US); Uma S. Chunduri, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 465 days.

(21) Appl. No.: 16/077,853

(22) PCT Filed: Apr. 1, 2016

(86) PCT No.: PCT/IB2016/051891
§ 371 (c)(1),
(2) Date: Aug. 14, 2018

(87) PCT Pub. No.: WO2017/141080
PCT Pub. Date: Aug. 24, 2017

(65) Prior Publication Data
US 2021/0092044 A1    Mar. 25, 2021

Related U.S. Application Data

(60) Provisional application No. 62/295,453, filed on Feb. 15, 2016.

(51) Int. Cl.
*H04L 12/721* (2013.01)
*H04L 12/717* (2013.01)
*H04L 12/741* (2013.01)

(52) U.S. Cl.
CPC .............. *H04L 45/12* (2013.01); *H04L 45/42* (2013.01); *H04L 45/74* (2013.01)

(58) Field of Classification Search
CPC ......... H04L 45/12; H04L 45/74; H04L 45/42; H04L 45/122
See application file for complete search history.

(56) References Cited

U.S. PATENT DOCUMENTS

| | | | |
|---|---|---|---|
| 7,940,695 B1 | 5/2011 | Bahadur et al. | |
| 9,660,897 B1 | 5/2017 | Gredler | |

(Continued)

FOREIGN PATENT DOCUMENTS

| | | |
|---|---|---|
| CN | 102857422 A | 1/2013 |
| JP | 2005-318409 A | 11/2005 |

(Continued)

OTHER PUBLICATIONS

International Preliminary Report on Patentability for International Application No. PCT/IB2016/051891, dated Aug. 21, 2018, 9 pages.

(Continued)

*Primary Examiner* — Afshawn M Towfighi
(74) *Attorney, Agent, or Firm* — Nicholson De Vos Webster & Elliott LLP

(57) ABSTRACT

Techniques for exposing maximum node and/or link segment identifier depth using OSPF are described. A network element in a Segment Routing (SR) network transmits a Type Length Value (TLV) element including a Maximum Segment Identifier Depth (MSD) value utilizing OSPF. The MSD value identifies a maximum number of segment identifier (SID) labels that the network element is able to push into packet headers of received packets to enable forwarding of the received packets through the SR network. The network element receives, from a controller, data for a path to be utilized by the network element for forwarding the received packets through the SR network. The data includes one or more SID labels to be pushed into the received packets, and the SID labels have fewer than or equal to the (Continued)

MSD value. The controller and the network element do not utilize Path Computation Element Protocol (PCEP) over a southbound interface.

14 Claims, 11 Drawing Sheets

(56) References Cited

U.S. PATENT DOCUMENTS

| | | | |
|---|---|---|---|
| 9,967,184 B2* | 5/2018 | Tantsura | H04L 45/72 |
| 2009/0144443 A1 | 6/2009 | Vasseur et al. | |
| 2013/0235716 A1 | 9/2013 | Vasseur | |
| 2014/0254596 A1* | 9/2014 | Filsfils | H04L 45/02 370/392 |
| 2014/0269266 A1 | 9/2014 | Filsfils et al. | |
| 2015/0003458 A1 | 1/2015 | Li et al. | |
| 2015/0089081 A1 | 3/2015 | Thubert et al. | |
| 2015/0103844 A1 | 4/2015 | Zhao et al. | |
| 2016/0014025 A1 | 1/2016 | Wang | |
| 2016/0359728 A1 | 12/2016 | Ficara et al. | |
| 2017/0005922 A1* | 1/2017 | Tantsura | H04L 45/72 |
| 2017/0180247 A1 | 6/2017 | Lin et al. | |

FOREIGN PATENT DOCUMENTS

| | | |
|---|---|---|
| RU | 2507698 C2 | 2/2014 |
| WO | 2014055968 A1 | 4/2014 |
| WO | 2015173669 A1 | 11/2015 |

OTHER PUBLICATIONS

International Preliminary Report on Patentability for International Application No. PCT/IB2016/051892, dated Aug. 30, 2018, 10 pages.
Filsfilsl C., et al., "Segment Routing Architecture, draft-ietf-spring-segment-routing-07," Network Working Group, Internet-Draft, Dec. 15, 2015, 24 pages.
Sivabalan S., et al., "PCEP Extensions for Segment Routing, draft-ietf-pce-segment-routing-06.txt," Network Norking Group, Internet-Draft, Aug. 9, 2015, 21 pages.
Xu X., et al., "Signaling Entropy Label Capability Using OSPF, draft-ietf-ospf-mpls-elc-01," Network Working Group, Internet-Draft, Nov. 9, 2015, 5 pages.
Sivabalan S., et al., "PCEP Extensions for Segment Routing, draft-ietf-pce-segment-routing-OO.txt," Network A/orking Group, Internet-Draft, Oct. 26, 2014, 18 pages.
Cabadas, Pablo Aguilar, "BGP-LS Extensions for Segment Routing support", PCE Prototype with Segment Routing and BGPLS Support, Universidad Carlos III de Madrid, 2014, pp. 73-75.
Katz et al., "Traffic Engineering (TE) Extensions to OSPF Version 2", Network Working Group, Request for Comments: 3630, Sep. 2003, pp. 1-14.
Li et al., "IS-IS Extensions for Traffic Engineering", Network Working Group, Request for Comments: 5305, pp. 1-17.
Lindem et al., "Extensions to OSPF for Advertising Optional Router Capabilities", Network Working Group, Request for Comments: 4970, Jul. 2007, pp. 1-13.
McPherson et al., "Simplified Extension of Link State PDU (LSP) Space for IS-IS", Network Working Group, Request for Comments: 5311, pp. 1-12.
Przygienda et al., "M-ISIS: Multi Topology (MT) Routing in Intermediate System to Intermediate Systems (IS-ISs)", Network Working Group, Request for Comments: 5120, pp. 1-14.
Vasseur et al., "Intermediate System to Intermediate System (IS-IS) Extensions for Advertising Router Information", Network Working Group, Request for Comments: 4971, Jul. 2007, pp. 1-9.
Gredler, H. et al., "North-Bound Distribution of Link-State and TE Information using BGP," Inter-Domain Routing Internet Draft, Oct. 16, 2015, draft-ietf-idr-ls-distribution-13, 48 pages.

Xu, X. et al., "Signaling Entropy Label Capability Using OSPF," Network Working Group Internet Draft, Nov. 9, 2015, draft-ietf-ospf-mpls-elc-01, 6 pages.
Lindem, A. et al., "OSPFv3 LSA Extendibility," Network Working Group Internet Draft, Nov. 19, 2015, draft-ietf-ospf-ospfv3-lsa-extend-09, 38 pages.
Sivabalan, S. et al., "PCEP Extensions for Segment Routing," Network Working Group Internet Draft, May 31, 2015, draft-ietf-pce-segment-routing-05, 22 pages.
Filsfils, C. et al., "Segment Routing Architecture," Network Working Group Internet Draft, May 28, 2015, draft-ietf-spring-segment-routing-03, 19 pages.
Filsfils, C. et al., "Segment Routing with MPLS Data Plane," Network Working Group Internet Draft, May 29, 2015, draft-ietf-spring-segment-routing-mpls-01, 13 pages.
Psenak, P. et al., "OSPFv2 Prefix/Link Attribute Advertisement," IETF RFC 7684, Nov. 2015, 16 pages.
Gredler, H. et al., "North-Bound Distribution of Link-State and TE Information using BGP," Inter-Domain Routing, Internet-Draft, Jun. 4, 2015, draft-ietf-idr-ls-distribution-11, 45 pages.
Xu, X. et al., "Signaling Entropy Label Capability Using OSPF," Network Working Group, Internet-Draft, Apr. 20, 2015, draft-ietf-ospf-mpls-elc-00, 5 pages.
Xu, X. et al., "Signaling Entropy Label Capability Using IS-IS," Network Working Group, Internet-Draft, May 19, 2015, draft-ietf-isis-mpls-elc-00, 5 pages.
Tantsura et al., "Signaling Maximum SID Depth using Border Gateway Protocol Link-State, draft-tantsura-bgp-ls-segment-routing-msd-00", IDR Working Group, Internet-Draft, Jul. 6, 2015, 5 pages.
Filsfils et al., "Segment Routing Use Cases, draft-filsfils-spring-segment-routing-use-cases-01", Network Working Group, Internet-Draft, Oct. 21, 2014, 35 pages.
S. Bradner, "Key words for use in RFCs to Indicate Requirement Levels", Network Working Group, Request for Comments: 2119, Mar. 1997, 3 pages.
Previdi et al., "IS-IS Extensions for Segment Routing, draft-ietf-isis-segment-routing-extensions-05", IS-IS for IP Internets, Internet-Draft, Jun. 30, 2015, 37 pages.
Psenak et al., "OSPF Extensions for Segment Routing, draft-ietf-ospf-segment-routing-extensions-05", Open Shortest Path First IGP, Internet-Draft, Jun. 26, 2015, 29 pages.
Gredler, H. et al., "BGP Link-State extensions for Segment Routing; draft-gredler-idr-bgp-ls-segment-routing-extension-02", Inter-Domain Routing, Internet-Draft, Oct. 16, 2014, 11 pages.
International Search Report and Written Opinion for Application No. PCT/IB2016/051891, dated Oct. 31, 2016, 13 pages.
International Search Report and Written Opinion for Application No. PCT/IB2016/051892, dated Oct. 31, 2016, 13 pages.
Tantsura, J. et al., "Signaling Maximum SID Depth using Border Gateway Protocol Link-State," IDR Working Group Internet-Draft, Jan. 11, 2016, 5 pages.
Tantsura, J. et al., "Signaling MSD (Maximum SID Depth) using OSPF," OSPF Working Group Internet-Draft, Mar. 9, 2016, 6 pages.
Xu, X. et al., "Signaling Entropy Label Capability Using IS-IS," Network Working Group Internet-Draft, Nov. 10, 2015, 5 pages.
Postel, J., "User Datagram Protocol," Aug. 28, 1980, RFC: 768, 3 pages.
"Transmission Control Protocol, DARPA Internet Program Protocol Specification," Sep. 1981, RFC: 793, Information Sciences Institute, University of Southern California, Marina del Rey, California, 91 pages.
Hedrick, C., "Routing Information Protocol," Jun. 1988, Network Working Group, Request for Comments: 1058, 33 pages.
Oran, David, "OSI IS-IS Intra-domain Routing Protocol," Feb. 1990, Network Working Group, Request for Comments: 1142, 157 pages.
Socolofsky, T. et al., "A TCP/IP Tutorial," Jan. 1991, Network Working Group, Request for Comments: 1180, 28 pages.
Malkin, G., et al., "RIPng for IPv6," Jan. 1997, Network Working Group, Request for Comments: 2080, 19 pages.
Braden, R. et al., "Resource ReSerVation Protocol (RSVP)—Version 1 Functional Specification," Sep. 1997, Network Working Group, Request for Comments: 2205, 112 pages.

(56) References Cited

OTHER PUBLICATIONS

Wroclawski, J., "The Use of RSVP with IETF Integrated Services," Sep. 1997, Network Working Group, Request for Comments: 2210, 33 pages.
Wroclawski, J., "Specification of the Controlled-Load Network Element Service," Sep. 1997, Network Working Group, Request for Comments: 2211, 19 pages.
Shenker, S. et al., "Specification of Guaranteed Quality of Service," Sep. 1997, Network Working Group, Request for Comments: 2212, 20 pages.
Moy, J., "OSPF Version 2," Apr. 1998, Network Working Group, Request for Comments: 2328, The Internet Society, 244 pages.
Malkin, G., "RIP Version 2," Nov. 1998, Network Working Group, Request for Comments: 2453, The Internet Society, 39 pages.
Deering, S. et al., "Internet Protocol, Version 6 (IPv6) Specification," Dec. 1998, Network Working Group, Request for Comments: 2460, The Internet Society, 39 pages.
Nichols, K. et al., "Definition of the Differentiated Services Field (DS Field) in the IPv4 and IPv6 Headers," Dec. 1998, Network Working Group, Request for Comments: 2474, The Internet Society, 20 pages.
Blake, S. et al., "An Architecture for Differentiated Services," Dec. 1998, Network Working Group, Request for Comments: 2475, The Internet Society, 36 pages.
Heinanen, J. et al., "Assured Forwarding PHB Group," Jun. 1999, Network Working Group, Request for Comments: 2597, The Internet Society, 11 pages.
Borman, D. et al., "IPv6 Jumbograms," Aug. 1999, Network Working Group, Request for Comments: 2675, The Internet Society, 9 pages.
Black, D., "Differentiated Services and Tunnels," Oct. 2000, Network Working Group, Request for Comments: 2983, The Internet Society, 14 pages.
Nichols, K. et al., "Definition of Differentiated Services Per Domain Behaviors and Rules for their Specification," Apr. 2001, Network Working Group, Request for Comments: 3086, The Internet Society, 24 pages.
Black, D. et al., "Per Hop Behavior Identification Codes," Jun. 2001, Network Working Group, Request for Comments: 3140, The Internet Society, 8 pages.
Awduche, D. et al., "RSVP-TE: Extensions to RSVP for LSP Tunnels," Dec. 2001, Network Working Group, Request for Comments: 3209, The Internet Society, 61 Pages.
Davie, B. et al., "An Expedited Forwarding PHB (Per-Hop Behavior)," Mar. 2002, Network Working Group, Request for Comments: 3246, The Internet Society, 16 pages.
Charny, A. et al., "Supplemental Information for the New Definition of the EF PHB (Expedited Forwarding Per-Hop Behavior)," Mar. 2002, Network Working Group, Request for Comments: 3247, The Internet Society, 24 pages.
Grossman, D., "New Terminology and Clarifications for Diffserv," Apr. 2002, Network Working Group, Request for Comments: 3260, The Internet Society, 10 pages.
Baker, F. et al., "Management Information Base for the Differentiated Services Architecture," May 2002, Network Working Group, Request for Comments: 3289, The Internet Society, 116 pages.
Bernet, Y. et al., "An Informal Management Model for Diffserv Routers," May 2002, Network Working Group, Request for Comments: 3290, The Internet Society, 56 pages.
Chan, K. et al., "Differentiated Services Quality of Service Policy Information Base," Mar. 2003, Network Working Group, Request for Comments: 3317, The Internet Society, 96 pages.
Berger, L., "Generalized Multi-Protocol Label Switching (GMPLS) Signaling Resource ReserVation Protocol—Traffic Engineering (RSVP-TE) Extensions," Jan. 2003, Network Working Group, Request for Comments: 3473, The Internet Society, 42 pages.
Kompella, K. et al., "Procedures for Modifying the Resource reSerVation Protocol (RSVP)," Oct. 2004, Network Working Group, Request for Comments: 3936, The Internet Society, 7 pages.
Fenner, B. et al., "Management Information Base for the User Datagram Protocol (UDP)," Jun. 2005, Network Working Group, Request for Comments: 4113, The Internet Society, 19 pages.
Rekhter, Y. et al., "A Border Gateway Protocol 4 (BGP-4)," Jan. 2006, Network Working Group, Request for Comments: 4271, The Internet Society, 104 pages.
Kent, S. et al., "Security Architecture for the Internet Protocol," Dec. 2005, Network Working Group, Request for Comments: 4301, The Internet Society, 101 pages.
Housley, R. et al., "Using Advanced Encryption Standard (AES) CCM Mode with IPsec Encapsulating Security Payload (ESP)," Dec. 2005, Network Working Group, Request for Comments: 4309, The Internet Society, 13 pages.
Rosen, E. et al., "BGP/MPLS IP Virtual Private Networks (VPNs)," Feb. 2006, Network Working Group, Request for Comments: 4364, The Internet Society, 47 pages.
Polk, J. et al., "A Resource Reservation Protocol (RSVP) Extension for the Reduction of Bandwidth of a Reservation Flow," May 2006, Network Working Group, Request for Comments: 4495, The Internet Society, 21 pages.
Ali, Z. et al., "Node-ID Based Resource Reservation Protocol (RSVP) Hello: A Clarification Statement," Jun. 2006, Network Working Group, Request for Comments: 4558, The Internet Society, 7 pages.
Babiarz, J. et al., "Configuration Guidelines for DiffServ Service Classes," Aug. 2006, Network Working Group, Request for Comments: 4594, The Internet Society, 57 pages.
Andersson, L. et al., "LDP Specification," Oct. 2007, Network Working Group, Request for Comments: 5036, The IETF Trust, 135 pages.
Coltun, R. et al., "OSPF for IPv6," Jul. 2008, Network Working Group, Request for Comments: 5340, The IETF Trust, 94 pages.
Eggert, L. et al., "Unicast UDP Usage Guidelines for Application Designers," Nov. 2008, Network Working Group, Request for Comments: 5405, IETF Trust and the persons identified as the document authors, 27 pages.
Baker, F. et al., "A Differentiated Services Code Point (DSCP) for Capacity-Admitted Traffic," May 2010, Internet Engineering Task Force (IETF), Request for Comments: 5865, IETF Trust and the persons identified as the document authors, 14 pages.
Previdi et al., "IS-IS Extensions for Segment Routing", IS-IS for IP Internets Internet-Draft, Feb. 13, 2014 (retrieved from: https://tools.ietf.org/html/draft-previdi-isis-segment-routing-extensions-05) (Year: 2014), 27 pages.

* cited by examiner

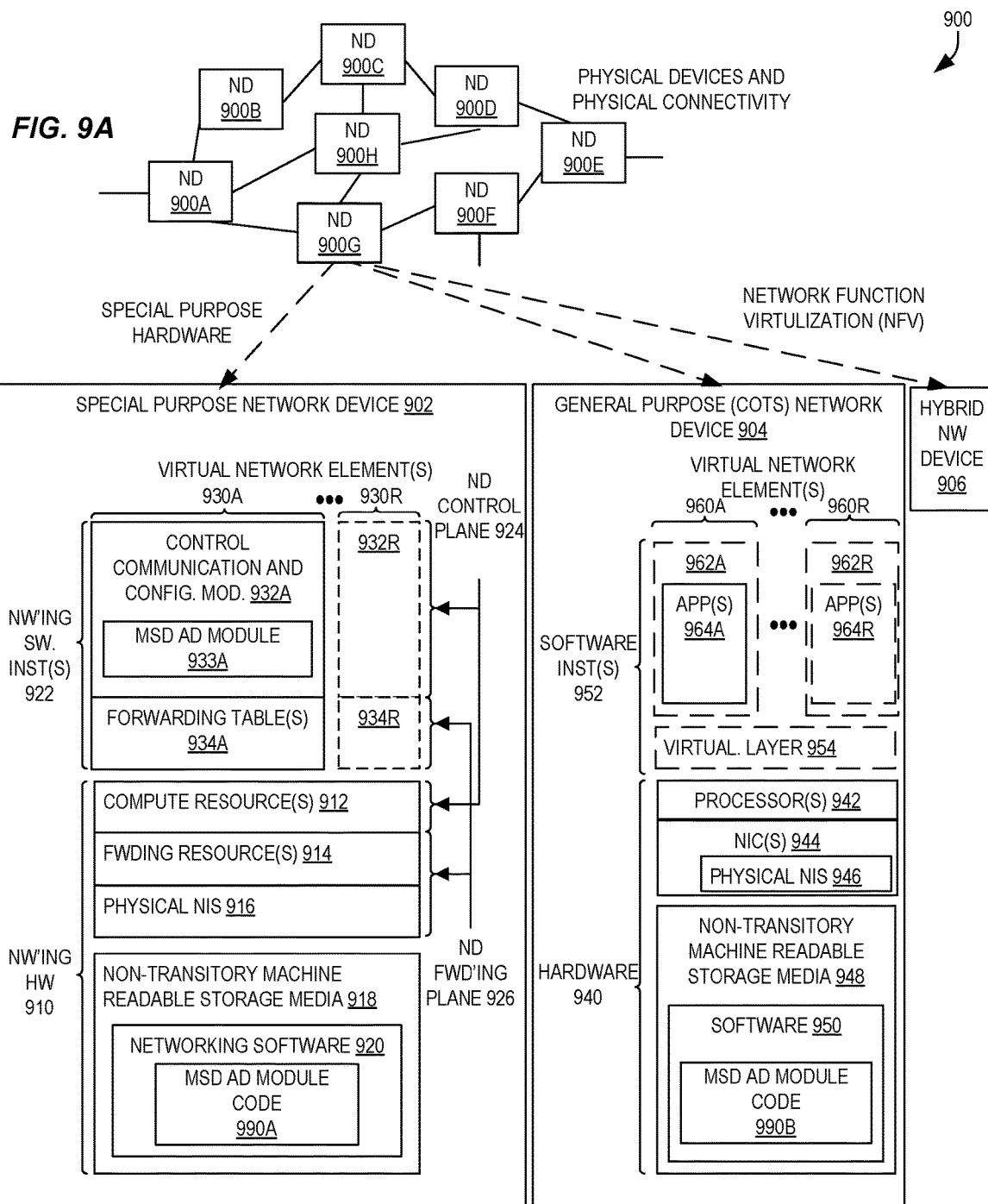
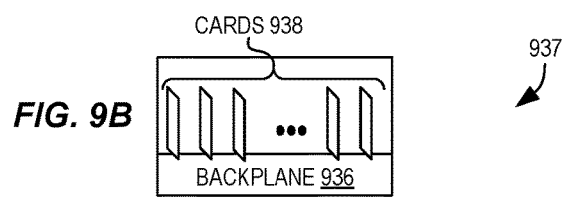

TECHNIQUES FOR EXPOSING MAXIMUM NODE AND/OR LINK SEGMENT IDENTIFIER DEPTH UTILIZING OSPF

CROSS-REFERENCE TO RELATED APPLICATIONS

This application is a national stage of International Application No. PCT/IB2016/051891, filed Apr. 1, 2016, which claims the benefit of U.S. Provisional Application No. 62/295,453, filed Feb. 15, 2016, which are all hereby incorporated by reference.

FIELD

Embodiments of the invention relate to the field of computer networking; and more specifically, to techniques for exposing maximum node and/or link segment identifier depth utilizing Open Shortest Path First (OSPF).

BACKGROUND

Segment Routing (SR) is a recently-developed routing technique leveraging the source routing paradigm. In SR networks, a node steers a packet through an ordered list of instructions called segments. A segment can represent any instruction, topological or service-based, and can have a local semantic to an SR node or global within an SR domain.

SR allows traffic of a flow to be passed through any topological path and service chain while maintaining per-flow state only at the ingress node to the SR domain. SR can be directly applied to the common Multiprotocol Label Switching (MPLS) architecture without requiring any change to the forwarding planes of participating nodes. For example, a segment can be encoded as an MPLS label, and an ordered list of segments can be encoded as a stack of labels. The segment to process is on the top of the stack. Upon completion of a segment, the related label is popped from the stack.

SR can also be applied to the Internet Protocol (IP) version 6 (IPv6) architecture using a new type of routing extension header. A segment can be encoded as an IPv6 address. An ordered list of segments is encoded as an ordered list of IPv6 addresses in the routing extension header. The segment to process is indicated by a pointer in the routing extension header. Upon completion of a segment, the pointer is incremented.

SR can provide many benefits, including enabling a scalable end-to-end policy, the fact that it was designed for IP and Software Defined Networking (SDN) (i.e., has Equal-Cost Multi-path (ECMP) awareness, and balance between distributed intelligence, centralized optimization, and application-based policy creation), has operational simplicity, and can provide better utilization of the installed infrastructure thanks to centralized optimization.

SUMMARY

A method in a device implementing a network element in a SR network includes transmitting, by the network element, a Type Length Value (TLV) element including a Maximum Segment Identifier Depth (MSD) value. The TLV element is transmitted using the OSPF protocol. The MSD value identifies a maximum number of segment identifier (SID) labels that the network element is able to push into packet headers of received packets to enable forwarding of the received packets through the SR network. The method also includes receiving, from a controller, data for a path to be utilized by the network element for forwarding the received packets through the SR network. The data includes a set of one or more SID labels to be pushed into the received packets associated with the path. The set of SID labels includes less than or equal to the MSD value number of SID labels, and the controller and the network element do not utilize the Path Computation Element Protocol (PCEP) over a southbound interface.

In some embodiments, the OSPF protocol utilized comprises either OSPF version 2 (OSPFv2) or OSPF version 3 (OSPFv3).

In some embodiments, the TLV element is a node MSD TLV and is carried by either an OSPFv2 Router Information Opaque Link State Advertisement (LSA) or an OSPFv3 Router Information Opaque LSA.

In some embodiments, the TLV element is a link MSD sub-TLV and is carried by either an OSPFv2 Extended Link Opaque LSA, an OSPFv2 TE LSA, or an OSPVv3 E-Router-LSA.

In some embodiments, the method further includes determining, by the network element, the MSD value as a smallest one of one or more MSD values of one or more line cards of the network element.

According to some embodiments, a non-transitory computer-readable storage medium has instructions which, when executed by one or more processors of a device, cause the device to implement a network element in a SR network and perform operations. The operations include transmitting a TLV element including a MSD value. The TLV element is transmitted using the OSPF protocol. The MSD value identifies a maximum number of SID labels that the network element is able to push into packet headers of received packets to enable forwarding of the received packets through the SR network. The operations also include receiving, from a controller, data for a path to be utilized by the network element for forwarding the received packets through the SR network. The data includes a set of one or more SID labels to be pushed into the received packets associated with the path. The set of SID labels includes less than or equal to the MSD value number of SID labels, and the controller and the network element do not utilize the PCEP over a southbound interface.

In some embodiments, a device includes one or more processors and a non-transitory computer-readable storage medium. The non-transitory computer-readable storage medium has instructions which, when executed by the one or more processors, cause the device to implement a network element in a SR network and perform operations. The operations include transmitting a TLV element including a MSD value. The TLV element is transmitted using the OSPF protocol. The MSD value identifies a maximum number of SID labels that the network element is able to push into packet headers of received packets to enable forwarding of the received packets through the SR network. The operations also include receiving, from a controller, data for a path to be utilized by the network element for forwarding the received packets through the SR network. The data includes a set of one or more SID labels to be pushed into the received packets associated with the path. The set of SID labels includes less than or equal to the MSD value number of SID labels, and the controller and the network element do not utilize the PCEP over a southbound interface.

A system includes a controller and a network element. The network element, which is implemented by a device, participates in a SR network and performs operations. The operations include transmitting a TLV element including a MSD value. The TLV element is transmitted using the OSPF protocol. The MSD value identifies a maximum number of SID labels that the network element is able to push into packet headers of received packets to enable forwarding of the received packets through the SR network. The operations also include receiving, from the controller, data for a path to be utilized by the network element for forwarding the received packets through the SR network. The data includes a set of one or more SID labels to be pushed into the received packets associated with the path. The set of SID labels includes less than or equal to the MSD value number of SID labels, and the controller and the network element do not utilize the PCEP over a southbound interface.

According to some embodiments, a method in a controller communicatively coupled with a plurality of network elements of a SR network includes receiving, from a first network element of the plurality of network elements, a TLV element including a MSD value. The TLV element is transmitted using the OSPF protocol. The MSD value identifies a maximum number of SID labels that the first network element is able to push into packet headers of received packets to enable forwarding of the received packets through the SR network. The method also includes determining, based upon the MSD value, a path from the first network element to a second network element of the plurality of network elements for an identifiable set of traffic that includes a set of one or more SID labels. A number of SID labels in the set of SID labels is necessarily less than or equal to the MSD value. The method also includes sending, to the first network element, data for the path to be utilized by the network element for the forwarding of the received packets through the SR network. The data includes the set of SID labels to be pushed into received packets of the identifiable set of traffic. The controller and the first network element do not utilize the PCEP over a southbound interface.

In some embodiments, the OSPF protocol comprises either OSPF version 2 (OSPFv2) or OSPF version 3 (OSPFv3).

In some embodiments, the TLV element is a node MSD TLV and is carried by either an OSPFv2 Router Information Opaque LSA, or an OSPFv3 Router Information Opaque LSA.

In some embodiments, the TLV element is a link MSD sub-TLV and is carried by either an OSPFv2 Extended Link Opaque LSA, an OSPFv2 TE LSA, or an OSPVv3 E-Router-LSA.

According to some embodiments, a non-transitory computer-readable storage medium has instructions which, when executed by one or more processors of a device, cause the device to implement a controller to be communicatively coupled with a plurality of network elements of a SR network and perform operations. The operations include receiving, from a first network element of the plurality of network elements, a TLV element including a MSD value. The TLV element was transmitted using the OSPF protocol. The MSD value identifies a maximum number of SID labels that the first network element is able to push into packet headers of received packets to enable forwarding of the received packets through the SR network. The operations also include determining, based upon the MSD value, a path from the first network element to a second network element of the plurality of network elements for an identifiable set of traffic that includes a set of one or more SID labels. A number of SID labels in the set of SID labels is necessarily less than or equal to the MSD value. The operations also include sending, to the first network element, data for the path to be utilized by the network element for the forwarding of the received packets through the SR network. The data includes the set of SID labels to be pushed into received packets of the identifiable set of traffic. The controller and the first network element do not utilize the PCEP over a southbound interface.

In some embodiments, a device includes one or more processors and a non-transitory computer readable storage medium. The non-transitory computer-readable storage medium has instructions which, when executed by the one or more processors, cause the device to implement a controller to be communicatively coupled with a plurality of network elements of a SR network and perform operations. The operations include receiving, from a first network element of the plurality of network elements, a TLV element including a MSD value. The TLV element was transmitted using the OSPF protocol. The MSD value identifies a maximum number of SID labels that the first network element is able to push into packet headers of received packets to enable forwarding of the received packets through the SR network. The operations also include determining, based upon the MSD value, a path from the first network element to a second network element of the plurality of network elements for an identifiable set of traffic that includes a set of one or more SID labels. A number of SID labels in the set of SID labels is necessarily less than or equal to the MSD value. The operations also include sending, to the first network element, data for the path to be utilized by the network element for the forwarding of the received packets through the SR network. The data includes the set of SID labels to be pushed into received packets of the identifiable set of traffic. The controller and the first network element do not utilize the PCEP over a southbound interface.

In some embodiments, a system includes a controller that is communicatively coupled with a plurality of network elements of a SR network. The controller can be implemented by a device and configured to perform operations. The operations include receiving, from a first network element of the plurality of network elements, a TLV element including a MSD value. The TLV element was transmitted using the OSPF protocol. The MSD value identifies a maximum number of SID labels that the first network element is able to push into packet headers of received packets to enable forwarding of the received packets through the SR network. The operations also include determining, based upon the MSD value, a path from the first network element to a second network element of the plurality of network elements for an identifiable set of traffic that includes a set of one or more SID labels. A number of SID labels in the set of SID labels is necessarily less than or equal to the MSD value. The operations also include sending, to the first network element, data for the path to be utilized by the network element for the forwarding of the received packets through the SR network. The data includes the set of SID labels to be pushed into received packets of the identifiable set of traffic. The controller and the first network element do not utilize the PCEP over a southbound interface.

BRIEF DESCRIPTION OF THE DRAWINGS

The invention may best be understood by referring to the following description and accompanying drawings that are used to illustrate embodiments of the invention. In the drawings:

FIG. 9A illustrates connectivity between network devices (NDs) within an exemplary network, as well as three exemplary implementations of the NDs according to some embodiments.

FIG. 9B illustrates an exemplary way to implement a special-purpose network device according to some embodiments.

DESCRIPTION OF EMBODIMENTS

Figure 1:
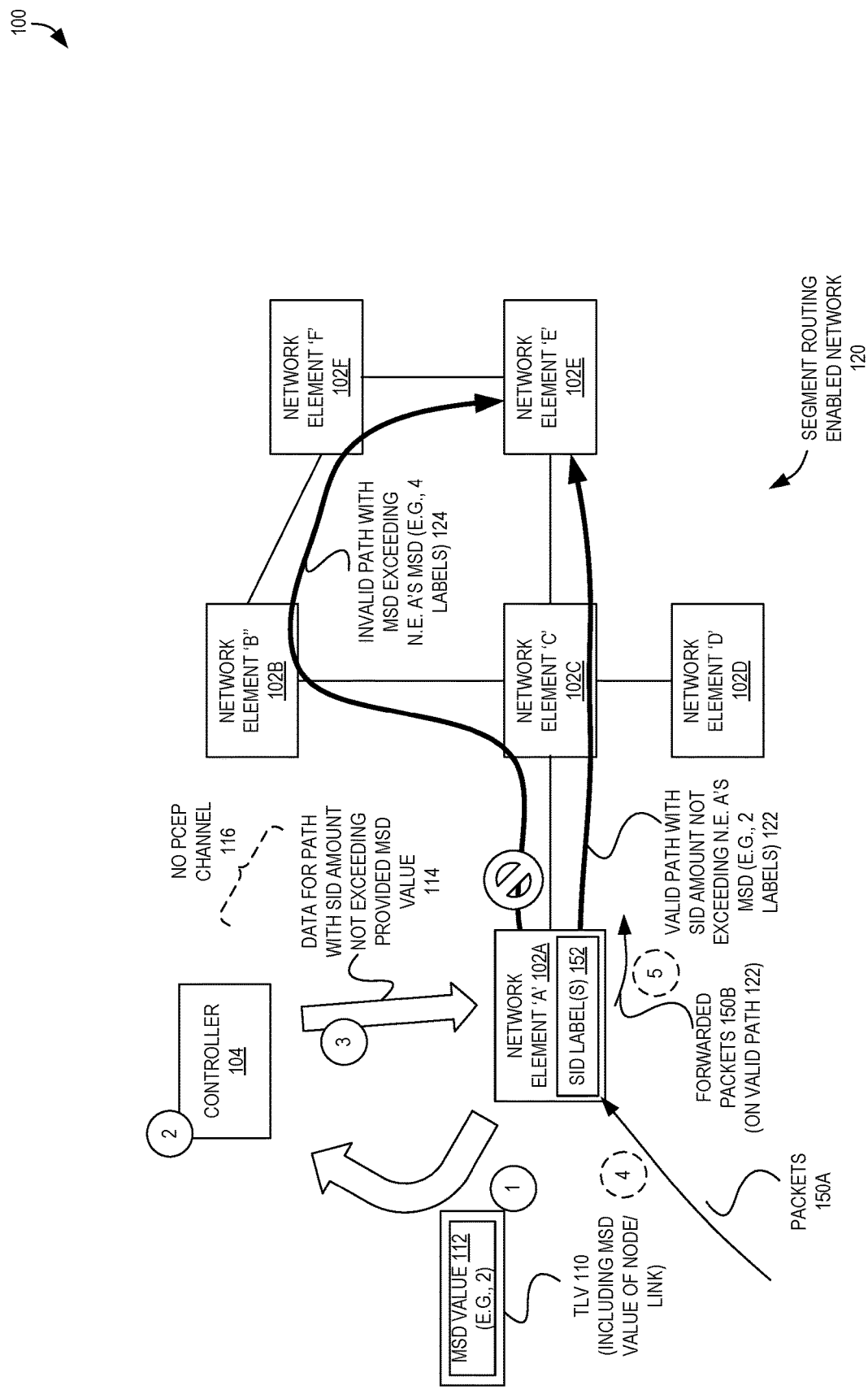
FIG. 1 is a high-level block diagram illustrating a system of network elements communicatively coupled within a SR-enabled network configured to expose maximum node and/or link segment identifier depth according to some embodiments.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In SR networks, a controller may be tasked with determining one or more Segment Identifiers (SIDs)(also referred to as a "label stack") that are to be added by a network element to network traffic to allow that traffic to transit a particular path in the SR network. For example, a network element (e.g., an edge router at the edge of the SR network portion) could receive a packet to be forwarded across the SR network, determine a configured set of SIDs to be inserted into the packet, and add those labels. These SIDs can be examined by other network elements in the SR network to quickly identify how the traffic is to be forwarded. As the packets move through the SR network, these SIDs can be stripped (or "popped") as a particular segment (or portion of the path) has been completed. Accordingly, a controller can configured a network element that initially receives the traffic to place a particular set of SIDs in the traffic to ensure that the traffic is forwarded appropriately.

However, many network devices (providing network element functionality) have limitations—based upon hardware and/or software—that limit how the network devices can process traffic. For example, different network devices have different capabilities to insert different numbers of SIDs into traffic, and even different components of network devices (e.g., line cards)—even within a single network device—can have different capabilities to insert different numbers of SIDs into traffic. For example, a single network device could employ a first line card only able to inject four labels, while a second line card of the single network device could inject twelve labels, and while a third line card of the single network device could inject sixteen labels.

Thus, when SR tunnels are computed by a centralized controller (e.g., a Path Computation Element (PCE) or SDN controller), it is crucial that the controller knows what the "Maximum SID Depth" (or "MSD") of the particular node is, so that it does not attempt to create a path/tunnel with a set of SID that is deeper (i.e., larger) than what the node is capable of inserting into the traffic.

For example, if a controller selects a path for a set of traffic that requires the insertion of six labels (SIDs), this path cannot be implemented by a network element that only has the ability to insert three labels into the traffic. In such situations, a variety of problems can result, which can cause network congestion, dropped traffic, and network failures.

Accordingly, efforts have been made to address this problem using extensions of the Path Computation Element Communication Protocol (PCEP) (e.g., via the southbound interface between a controller and its network elements serving as the forwarding plane, perhaps using a TLV within a PCEP OPEN message) by allowing a network element to provide a MSD value for the network element to the controller. Thus, the network element can report the maximum depth of SIDs that it can inject, and the controller can take that into account when determining paths for traffic so that it does not attempt to create a path having more SIDs than can be inserted by the network element.

Although this development is certainly useful, it still falls short in many environments where the PCEP is not used (or cannot be used), and thus the network elements cannot report their MSDs to a controller. For example, in many environments certain network elements (e.g., a network element at a head-end of a SR tunnel) do not support PCEP. (Additionally, any effort to use Border Gateway Protocol (BGP) for providing this information similarly is problematic as network elements in many deployments may also not support or "speak" BGP.)

Further, in environments where a single network device may have multiple capabilities on multiple links (e.g., different capabilities from different line cards), the aforementioned PCEP approach effectively "wastes" the ability of some components of the device. For example, to be safe it is apparent that using PCEP, the network element must report the smallest/lowest MSD capability that all of its components can support as its MSD value. Thus, this "wastes" the excess capabilities of any larger-capability components, as these components could inject larger numbers of SIDs but are unable to do so because the controller is not allowed to provide such SIDs to the network element for use. For example, for a network device with a first line card able to inject three labels and with a second line card able to inject sixteen labels, the network device would need to report back a MSD value of only three, and thus the controller can only provide three-label paths to the network device—likely severely limiting the paths that it can utilize, despite the fact that the second line card could handle larger sets of SIDs.

Accordingly, improved techniques that can remedy these deficiencies are desirable.

As described herein, in some embodiments a MSD value can be reported back to a controller using a Label Distribution Protocol (LDP) such as the OSPF protocol or the Intermediate System to Intermediate System (IS-IS) protocol, thereby eliminating the need for PCEP to be utilized. Moreover, in some embodiments a network element can optionally report (for the controller) a MSD for multiple of its links (e.g., line cards), which can allow the controller to more fully utilize the capabilities of the network by considering and/or installing longer sets of SIDs for those links that can accommodate them.

FIG. 1 is a high-level block diagram illustrating a system 100 of network elements 102A-102F communicatively coupled within a SR enabled network 120 configured to expose maximum node and/or link segment identifier depth according to some embodiments. This system includes a controller 104 and six network elements A-F (102A-102F) serving as the forwarding plane of the SR network 120. In this example, we assume that no PCEP channel 116 exists between the controller 104 and at least network element 'A' 102A. Notably, a PCEP channel 116 may or may not exist between others of the network elements B-F (102B-102F).

In this example, as illustrated by circle '1', network element 'A' 102A determines an MSD value 112 (e.g., two), and advertises the MSD value 112 within a TLV element 110. In some embodiments, this TLV element 110 is sent as part of an IGP advertisement, such as within an OSPF LSA or IS-IS TLV. As is known those of skill in the art, this advertisement can travel a variety of physical communication paths, as the network element 'A' 102A likely is not in direct communication with the controller, and instead, the advertised TLV 110 may be sent out one or more (or all) of its interfaces leading to other IGP-participating nodes, and eventually the advertised TLV 110 can be provided to the controller 104 at circle '2'.

At this point, the controller 104 can use the MSD value 112 of network element 'A' 102A when determining paths for traffic that is to transit the SR network 120 that is first received at network element 'A' 102A. Accordingly, when attempting to create a path for an identifiable group of traffic (e.g., a flow or other uniquely identifiable type of traffic, such as packets 150A), the controller 104 can limit its consideration of candidate paths to be programmed to only those requiring a same number (or smaller number) of SIDs to be injected by network element 'A' 102A. Thus, in some embodiments the MSD value 112 can be treated by the controller 104 similar to a TE requirement/constraint, thus limiting the path possibilities that can ultimately be selected.

In this example, the controller 104 at circle '3' will program network element 'A' 102A (e.g., send a message to network element 'A' 102A with data including path information such as the set of SIDs 152) with a path 114 having a number of SIDs that do not exceed the reported MSD value 112 of network element 'A' 102A—here, the valid path 122 is selected, which could utilize one or two SIDs, for example, to transit network element 'C' 102C and network element 'E' 102E. Thereafter, upon receipt of traffic (e.g., packets 150A at circle '4'), the network element 'A' 102A can identify the set of SIDs and inject the set of SIDs into that traffic, resulting in the traffic (forwarded packets 150B) being sent using the valid path 122 toward their destination at circle '5'.

For the sake of illustration, FIG. 1 also shows an invalid path 124 that might have been considered by the controller 104 but for the fact that it requires a larger SID label stack than the reported MSD value 112—for example, four labels. Notably, prior systems might have attempted to utilize this path due to a controller 104 not being aware of the capabilities of the network element 'A' 102A, which would have led to network problems that embodiments described herein can avoid.

As described earlier, the MSD value 112 can be advertised using a variety of IGP protocols, including but not limited to OSPF and IS-IS.

OSPF

Figure 2:
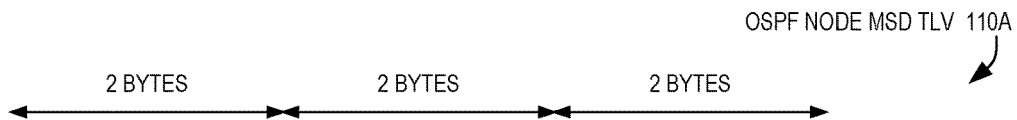
FIG. 2 illustrates an OSPF Node MSD TLV element, an OSPFv2 Router Information Opaque LSA carrying the OSPF Node MSD TLV, and an OSPFv3 Router Information Opaque LSA carrying the OSPF Node MSD TLV, which can be used for exposing maximum node segment identifier depth according to some embodiments.
Figure 2:
Figure 2:
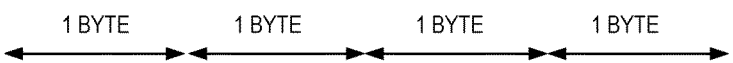
Figure 2:
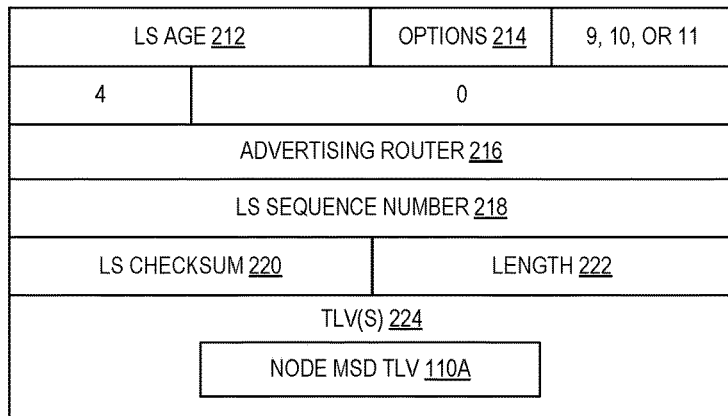
Figure 2:
Figure 2:
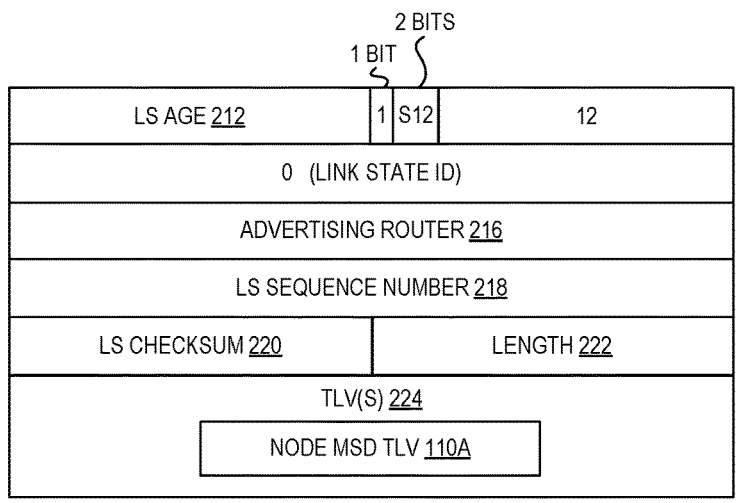

For example, FIG. 2 illustrates an OSPF Node MSD TLV element 110A, an OSPFv2 Router Information Opaque LSA 210 carrying the OSPF Node MSD TLV 110A, and an OSPFv3 Router Information Opaque LSA 250 carrying the OSPF Node MSD TLV 110A, which can be used for exposing maximum node segment identifier depth according to some embodiments.

In some embodiments, the OSPF Node MSD TLV 110A can be utilized to advertise a "node" MSD value 112A that is of a node (or network element) level of granularity. In some embodiments where multiple different supported SID depths may apply to a single network element (e.g., a network device has multiple different line cards with different injectable SID depths), the MSD value can be the lowest value of the multiple SID depths supported. This OSPF Node MSD TLV 110A includes a 2 byte type value 202, which can be a unique value (e.g., unique within a particular set of TLVs utilized in a particular system or according to a particular standard) that identifies the OSPF Node MSD TLV 110A as such, a 2 byte length value 204 indicating a length of the "value" part of the TLV 110A—the Node MSD value 112A.

The Node MSD value 112A, in some embodiments, is a 2 byte value including a value representing a number in the range of zero ("0") to 254. In some embodiments, a value of zero can represent a lack of ability of the sending network element to push a SIDs of any depth, and any other value can represent that particular number of SIDs supported by the node. Again, in some embodiments this value can represent the lowest value supported by node when multiple different link-level values of supported SID injectable-depth are possible (e.g., because of different types of line cards in a network element). Notably, in some embodiments the use of this OSPF Node MSD TLV 110A is optional, and thus it may or may not be advertised.

However, in some embodiments the OSPF Node MSD TLV 110A can be carried by an OSPFv2 Router Information Opaque LSA 210, which is described by Internet Engineering Task Force (IETF) Request for Comments (RFC) 4970. This OSPFv2 Router Information Opaque LSA 210 can include a 2 byte link state (LS) age 212 field, a 1 byte options 214 field, 1 byte carrying a representation of '9' or '10' or '11', 1 byte carrying a representation of '4' (an Opaque type value), 3 bytes carrying a representation of '0' (an Opaque ID value), 4 bytes of an advertising router 216 identifier, 4 bytes of a LS sequence number 218, 2 bytes of a LS checksum 220, 2 bytes of a length 222 of the size of the following TLV(s) 224, and the TLV(s) 224, which can carry this new Node MSD TLV 110A.

Similarly, in some embodiments OSPF Node MSD TLV 110A can be carried by an OSPFv3 Router Information Opaque LSA 250, which is also described by IETF RFC 4970. This OSPFv3 Router Information Opaque LSA 250 includes some similar and some different fields/values as the OSPFv2 Router Information Opaque LSA 210, and similarly carries the new Node MSD TLV 110A in its TLV(s) 224 field.

Figure 3:
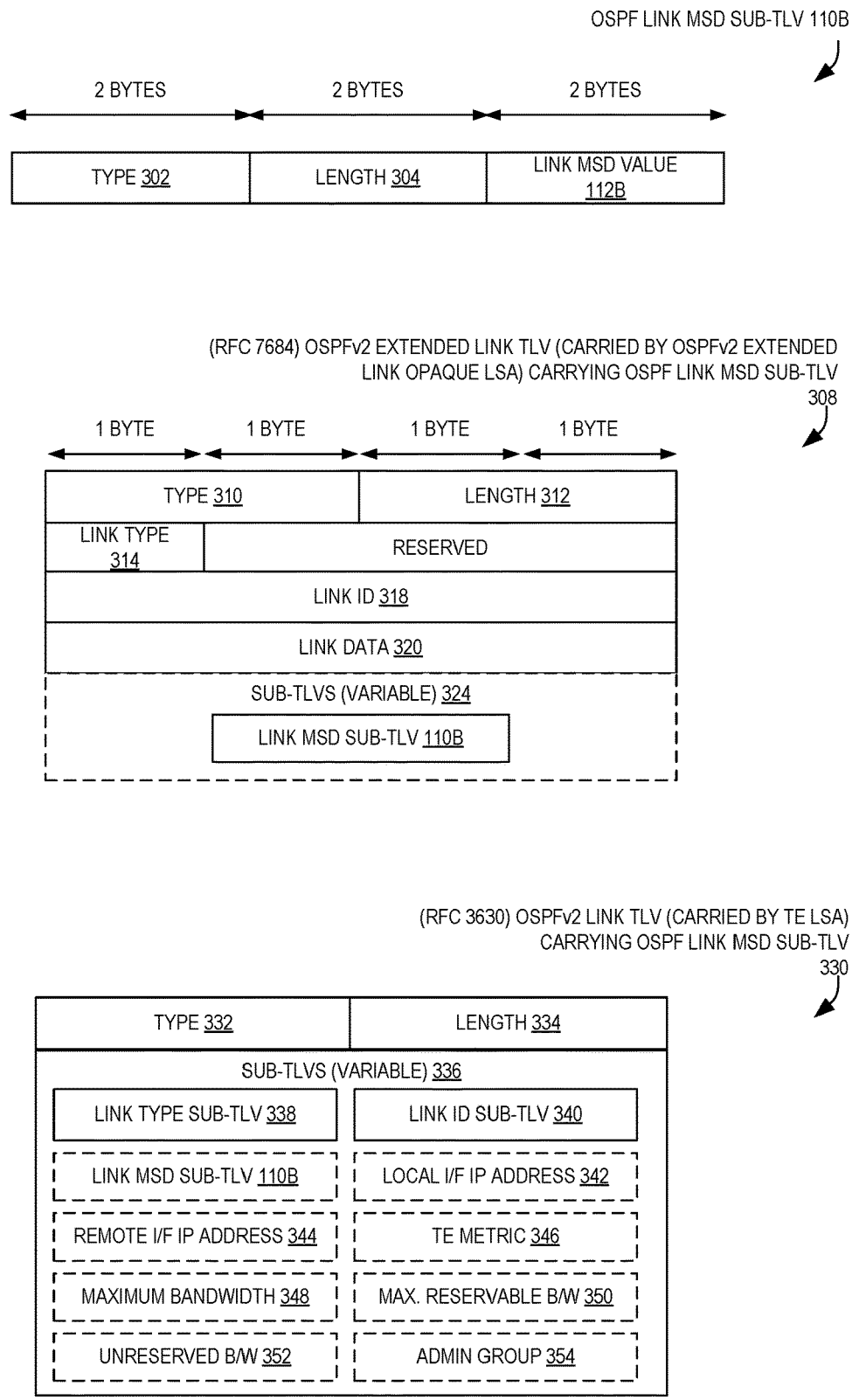
FIG. 3 illustrates an OSPF Link MSD sub-TLV element, an OSPFv2 Extended Link TLV carrying the OSPF Link MSD sub-TLV, and an OSPFv2 Link TLV carrying the OSPF Link MSD sub-TLV, which can be used for exposing maximum link segment identifier depth according to some embodiments.

As alluded to above, in some embodiments a network element can report different capabilities for SID injection sizes of the network element. Turning to FIG. 3, an illustration is provided of an OSPF Link MSD sub-TLV element 110B, an OSPFv2 Extended Link TLV 308 carrying the OSPF Link MSD sub-TLV, and an OSPFv2 Link TLV 330 carrying the OSPF Link MSD sub-TLV, which can be used for exposing maximum link segment identifier depth according to some embodiments.

In some embodiments, a network element can advertise one or more OSPF Link MSD sub-TLVs 110B—e.g., one for each link of the network element. The Link MSD sub-TLV 110B can include a 2 byte type 302 field including a unique identifier that identifies the Link MSD sub-TLVs 110B as such within a particular context, a 2 byte length value 304 indicating a length of the "value" part of the TLV—the link MSD value 112B. In some embodiments, the link MSD value 112B can be a 2 byte value that is a number in the range of 0-254, where 0 represents lack of ability to push SIDs of any depth, and any other value represents that number of SIDs for that particular link.

Accordingly, in some embodiments a network element can advertise different MSD values (i.e., link MSD values 112B) using multiple OSPF Link MSD sub-TLVs 110B.

One example OSPF message that can be used to carry one or more Link MSD sub-TLVs 110B is the OSPFv2 Extended Link TLV 308 described by IETF RFC 7684, and which itself can be carried within an OSPFv2 Extended Link Opaque LSA. The OSPFv2 Extended Link TLV 308 can include a 2 byte type 310, a 2 byte length 312, a 1 byte link type 314, 3 bytes of reserved space, a 4 byte link identifier 318, a 4 byte link data 320 value, and zero or more sub-TLVs 324, where the one or more Link MSD sub-TLVs 110B can optionally be carried.

Similarly, in some embodiments a network element can use an OSPFv2 Link TLV 330 described by IETF RFC 3630, which itself can be carried by a TE LSA. The OSPFv2 Link TLV 330 can include a type 332, length 334, and a variable number of sub-TLVs 336, including a link type sub-TLV 338, a link identifier sub-TLV 340, and optionally: the Link MSD sub-TLV 110B, a local interface IP address 342, a remote interface IP address 344, a TE metric 346, a maximum bandwidth 348, a maximum reservable bandwidth 350, an unreserved bandwidth 352, and/or an admin group 354 value. In some embodiments, each OSPFv2 Link TLV 330 may carry only one Link MSD sub-TLV 110B, and thus, two advertise multiple Link MSD sub-TLVs 110B, multiple OSPFv2 Link TLVs 330 can be sent by the network element (e.g., within a TE LSA).

Figure 4:
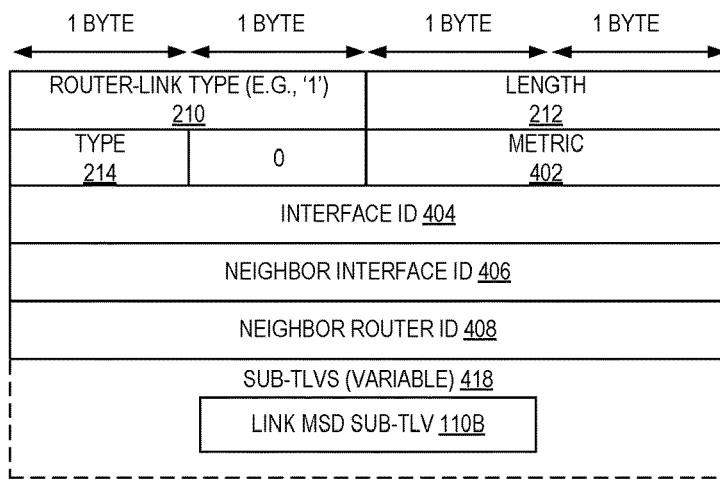
FIG. 4 illustrates an OSPFv3 Router-Link TLV carrying the OSPF Link MSD sub-TLV of FIG. 3 that can be used for exposing maximum link segment identifier depth according to some embodiments.

Additionally, FIG. 4 illustrates an OSPFv3 Router-Link TLV 400 carrying the OSPF Link MSD sub-TLV of FIG. 3 that can be used for exposing maximum link segment identifier depth according to some embodiments. The OSPFv3 Router-Link TLV 400 can include a 2 byte router-link type 210 (e.g., with a value of '1'), a 2 byte length 212, a 1 byte type 214, a 1 byte representation of zero, a 2 byte metric 402, a 4 byte interface identifier 404, a 4 byte neighbor interface identifier 406, a 4 byte neighbor router identifier 408, and a variable amount of sub-TLVs 418, which can carry a Link MSD sub-TLV 110B.

IS-IS

Figure 5:
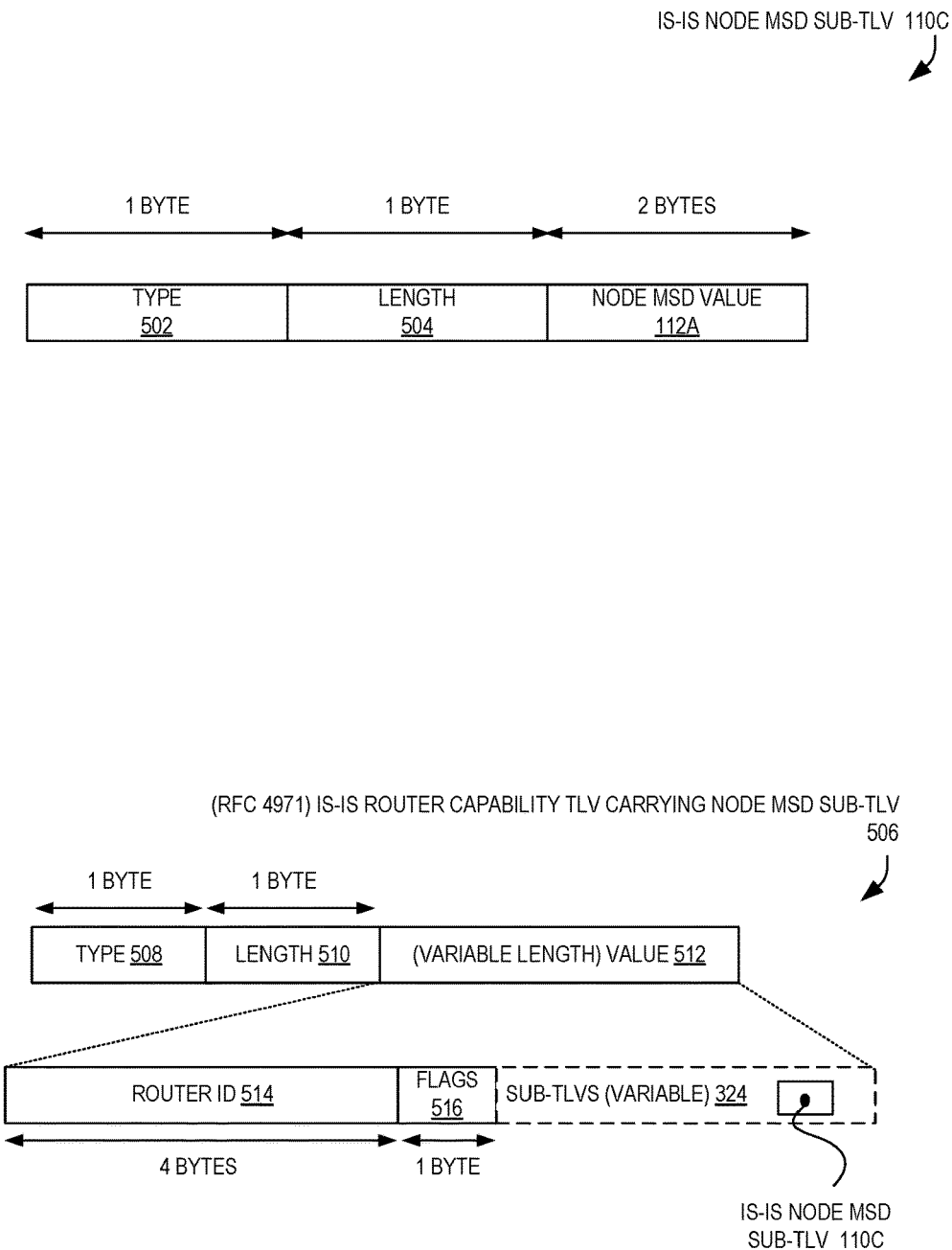
FIG. 5 illustrates an IS-IS Node MSD TLV element and an IS-IS Router Capability TLV carrying the IS-IS Node MSD TLV that which can be used for exposing maximum node segment identifier depth according to some embodiments.

As described earlier, various IGP protocols can be utilized for exposing maximum node and/or link segment identifier depth of network elements to a controller without the use of PCEP. For example, some embodiments utilize IS-IS. FIG. 5 illustrates an IS-IS Node MSD sub-TLV element 110C and an IS-IS Router Capability TLV 506 carrying the IS-IS Node MSD TLV that which can be used for exposing maximum node segment identifier depth according to some embodiments.

In some embodiments, the IS-IS Node MSD sub-TLV element 110C includes a 1 byte type 502 carrying a value that uniquely identifies the IS-IS Node MSD sub-TLV element 110C as being a IS-IS Node MSD sub-TLV element 110C within a particular context (e.g., is unique across all types of sub-TLVs in a particular usage scenario). The IS-IS Node MSD sub-TLV element 110C can also include a 1 byte length 504 value indicating a length of the "value" portion of the sub-TLV that carries the Node MSD value 112A, which is 2 bytes in some embodiments.

Similar to the Node MSD value 112A presented with regard to FIG. 2, this Node MSD value 112A can also be a 2 byte value representing a number in the range of zero ("0") to 254. In some embodiments, a value of zero can represent a lack of ability of the sending network element to push/inject a SIDs of any depth, and any other value can represent that particular number of SIDs that can be pushed/injected by the node. Again, in some embodiments this value can represent the lowest value supported by node when multiple different link-level values of supported SID injectable-depth are possible (e.g., because of different types of line cards in a network element).

In systems utilizing IS-IS, the IS-IS Node MSD sub-TLV element 110C can be advertised using, for example, an IS-IS Router Capability TLV 506 as defined by IETF RFC 4971. This IS-IS Router Capability TLV 506, in some embodiments, includes a 1 byte type 508, a 1 byte length 510 value, and a variable length "value" 512 portion. In some embodiments, the variable length value 512 portion can include a 4 byte router identifier 514, 1 byte of flags 515, and a variable amount of sub-TLVs 324, which can (optionally) carry the IS-IS Node MSD sub-TLV element 110C.

Figure 6:
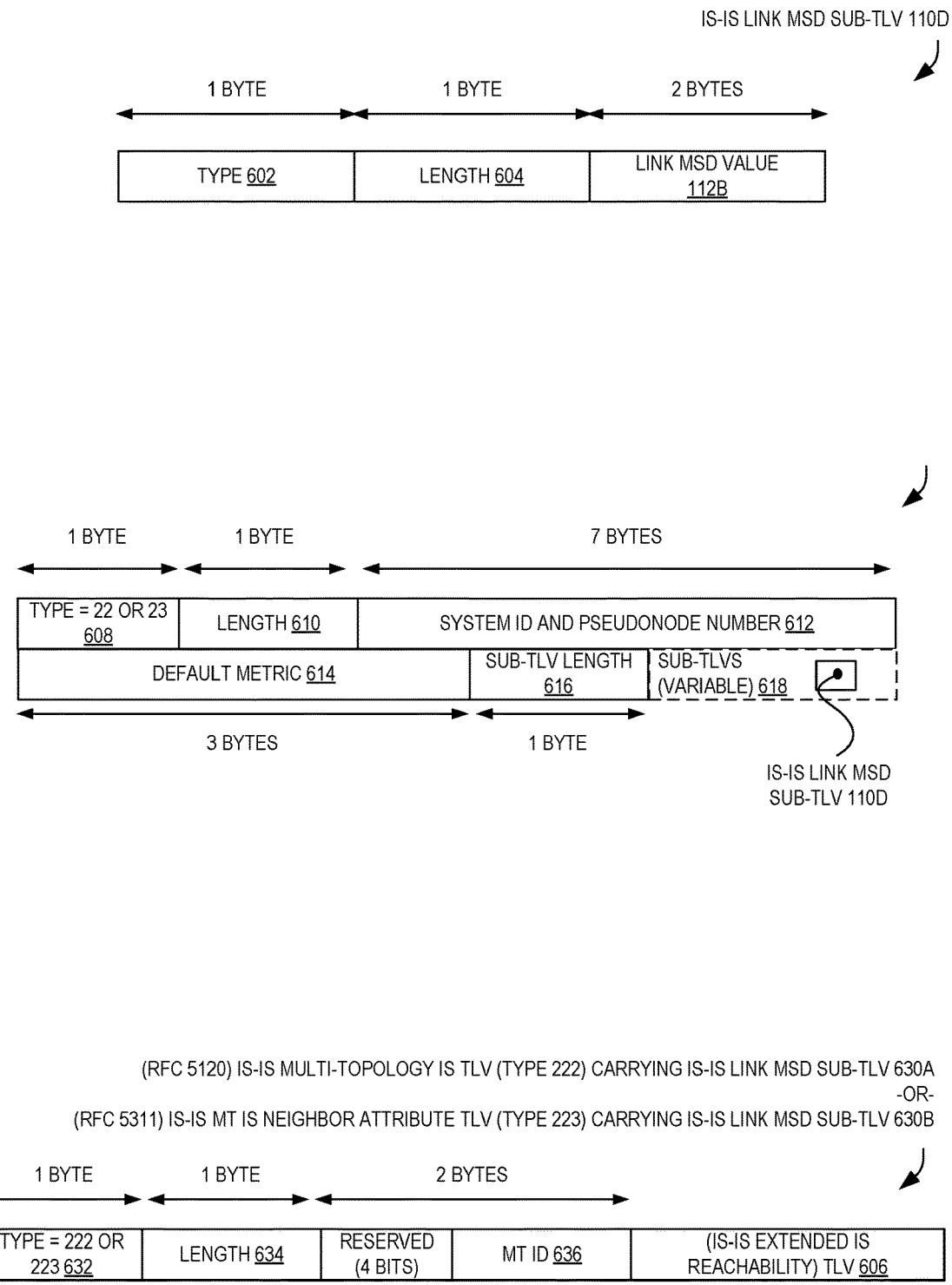
FIG. 6 illustrates an IS-IS Link MSD sub-TLV element and several types of IS-IS TLVs, which can be used for exposing maximum link segment identifier depth according to some embodiments.

Like in OSPF, link-level MSD values can similarly be advertised in systems utilizing IS-IS. FIG. 6 illustrates an IS-IS Link MSD sub-TLV element 110D and several types of IS-IS TLVs (606/630) that can be used for exposing maximum link segment identifier depth according to some embodiments.

In some embodiments, a new IS-IS Link MSD sub-TLV 110D can be used to carry per-link MSD values. For example, the IS-IS Link MSD sub-TLV 110D can include 1 byte of a type 602 that uniquely identifies the type of this sub-TLV, a 1 byte length 604 value of the "value" portion of the sub-TLV, which is the 2 byte link MSD value 112B.

The IS-IS Link MSD sub-TLV 110D can be carried by a variety of different IS-IS TLVs, depending upon context of use. For example, one or more IS-IS Link MSD sub-TLVs 110D can be carried by an IS-IS "Type 22" Extended IS Reachability TLV 606A, as described by IETF RFC 5305, or by an IS-IS "Type 23" IS Neighbor Attribute TLV 606B, as described by IETF RFC 5311.

These TLVs 606A-606B can include a 1 byte type 608 (of '22' or '23'), a 1 byte length 610 of the "value" of the TLV: namely, the 7 byte system ID and pseudonode number 612, a 3 byte default metric 614, a 1 byte sub-TLV length 616, and a variable number of sub-TLVs, which can include the one or more IS-IS Link MSD sub-TLVs 110D.

Similarly, the IS-IS Link MSD sub-TLV 110D can be carried by a "Type 222" IS-IS Multi-Topology (MT) IS TLV 630A, as described by IETF RFC 5120, or in a "Type 223" IS-IS MT IS Neighbor Attribute TLV 630B, as described by IETF RFC 5311. These TLVs 630A-630B can include a 1 byte type 632 (of '222' or '223'), a 1 byte length 634, 4 reserved bits, 12 bits of a MT identifier 636, and the TLV 606 (e.g., the IS-IS Extended IS Reachability TLV 606A illustrated above).

In some embodiments, only one IS-IS Link MSD sub-TLV 110D exists for a particular link. Although in some embodiments only one IS-IS Link MSD sub-TLV 110D is carried by a particular TLV (e.g., a Type 22/23/222/223 TLV as described above), in some embodiments multiple IS-IS Link MSD sub-TLVs 110D—i.e., for multiple links—can be packed into just one of these TLVs (e.g., Type 22/23/222/223).

Flows and System Components

Figure 7A:
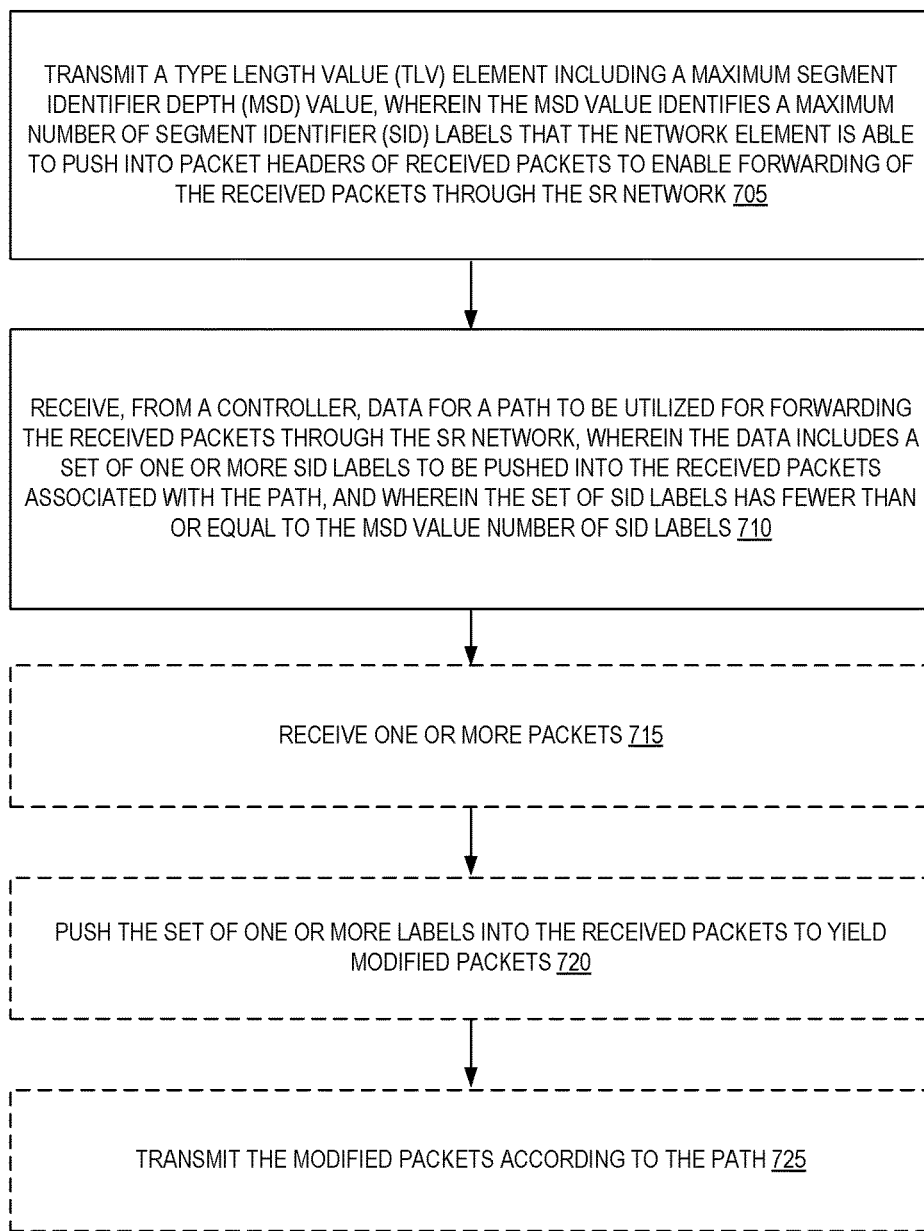
FIG. 7A illustrates a flow for exposing maximum node and/or link segment identifier depth according to some embodiments.

FIG. 7A illustrates a flow 700 for exposing maximum node and/or link segment identifier depth according to some embodiments. The operations in this flow diagram and the flow diagram of FIG. 8A will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. In some embodiments, though, flow 700 can be performed by a network element of FIG. 1, such as network element 'A' 102A, which can act as an "edge" router at the edge of a SR enabled network 120/act as a "head" end of a SR tunnel/path.

At block 705, the flow 700 includes transmitting a TLV element including a MSD value. This transmission can be performed by a network element in a SR network, and can be sent out one or more (or all) of its links leading to other network elements in the SR network. The MSD value identifies a maximum number of SID labels that the network element is able to push into packet headers of received packets to enable forwarding of the received packets through the SR network. In some embodiments, the TLV element is a sub-TLV, and in some embodiments the TLV element is a "regular" TLV element.

In some embodiments, the TLV element is part of an OSPF advertisement (e.g., an LSA), and in some embodiments the TLV element is part of an IS-IS advertisement (e.g., a TLV). The TLV element may directly or indirectly (e.g., via other network elements) ultimately be provided to a controller.

In various embodiments, the TLV element could be carried by an OSPFv2 Router Information Opaque LSA 210, an OSPFv3 Router Information Opaque LSA 250, an OSPFv2 Extended Link TLV 308, an OSPFv2 Link TLV 330, an OSPFv3 Router-Link TLV 400, an IS-IS Router Capability TLV 506, an IS-IS "Type 22" Extended IS Reachability TLV 606A, an IS-IS "Type 23" IS Neighbor Attribute TLV 606B, a "Type 222" IS-IS Multi-Topology (MT) IS TLV 630A, and/or a "Type 223" IS-IS MT IS Neighbor Attribute TLV 630B.

At block 710, the flow 700 also includes receiving, from the controller, data for a path to be utilized for forwarding the received packets through the SR network. The data includes a set of one or more SID labels to be pushed into any received packets associated with the path. Notably, the set of SID labels includes less than or equal to the MSD value number of SID labels initially transmitted at block 705.

Optionally, at blocks 715-720-725, the flow 700 can include receiving one or more packets (e.g., that can be associated with the path described with regard to block 710), pushing the set of one or more labels (e.g., the set of SIDs) into the received packets to yield modified packets, and transmitting the modified packets according to the path.

Figure 7B:
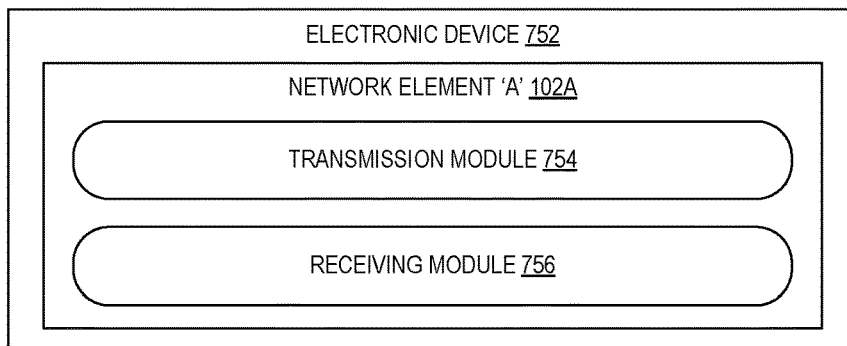
FIG. 7B illustrates a high-level block diagram of a network element that can perform the flow of FIG. 7A according to some embodiments.

FIG. 7B illustrates a high-level block diagram 750 of a network element 102A that can perform the flow 700 of FIG. 7A according to some embodiments.

It is not strictly necessary that each module depicted herein be implemented as physically separate units. Some or all modules may be combined in a physical unit. Also, the modules need not be implemented strictly in hardware. It is envisioned that the units may be implemented through a combination of hardware and software. For example, the electronic device 752 may include one or more central processing units executing program instructions stored in a non-transitory storage medium or in firmware to perform the functions of the modules.

The electronic device 752 can implement a network element 102A and include a transmission module 754 and receiving module 756.

The transmission module 754 can be adapted to transmit a TLV element including a MSD value, where the MSD value identifies a maximum number of SID labels that the network element is able to push into packet headers of received packets to enable forwarding of the received packets through the SR network. The TLV element can be transmitted utilizing an OSPF protocol. In some embodiments, the transmission module 754 can perform block 705 of flow 700 of FIG. 7A.

The receiving module 756 can be adapted to receive, from a controller, data for a path to be utilized for forwarding the received packets through the SR network, where the data includes a set of one or more SID labels to be pushed into the received packets associated with the path, and where the set of SID labels has fewer than or equal to the MSD value number of SID labels. In some embodiments, the receiving module 756 can perform block 710 of flow 700 of FIG. 7A.

In some embodiments, the electronic device 752 can include other non-illustrated modules, such as one or modules to perform blocks 715, 720, and/or 725 of flow 700 of FIG. 7A, and possibly can include other non-illustrated modules to perform other operations disclosed herein. Thus, the depicted embodiment is illustrative and not limiting.

Figure 8A:
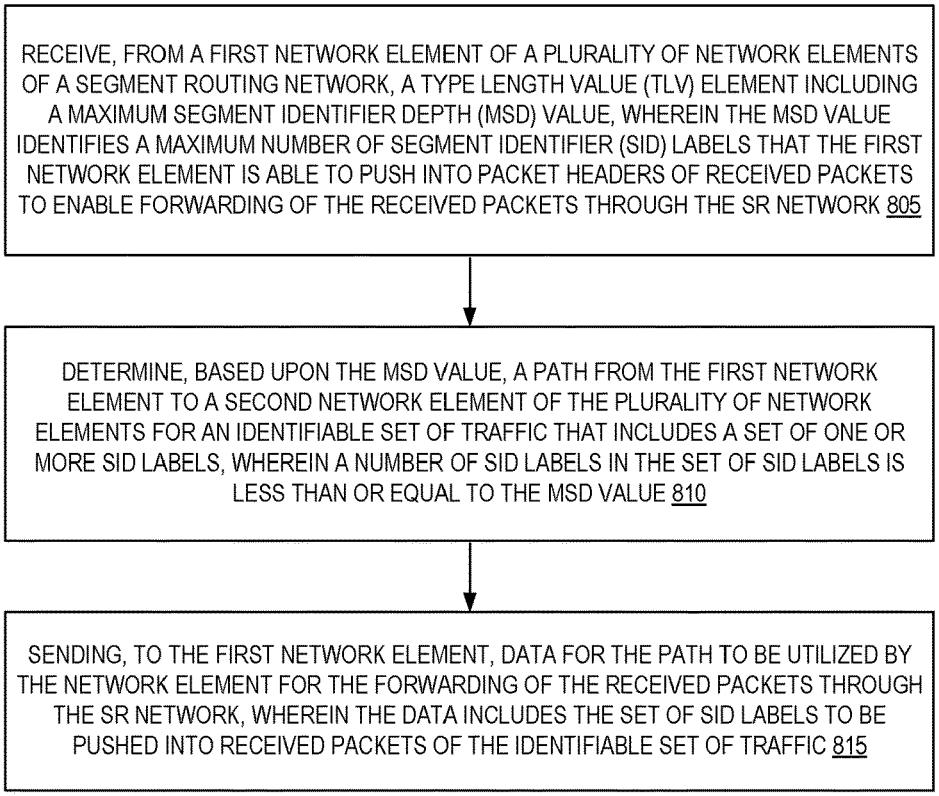
FIG. 8A illustrates a flow for utilizing an exposed maximum node and/or link segment identifier depth according to some embodiments.

FIG. 8A illustrates a flow 800 for utilizing an exposed maximum node and/or link segment identifier depth according to some embodiments. In some embodiments, flow 800 can be performed by a controller such as the controller 104 of FIG. 1.

At block 805, the flow 800 includes receiving, from a first network element of a plurality of network elements of a SR network, a TLV element including a MSD value. The MSD value identifies a maximum number of SID labels that the first network element is able to push into packet headers of received packets to enable forwarding of the received packets through the SR network.

In some embodiments, the TLV element is part of an OSPF advertisement (e.g., an LSA), and in some embodiments the TLV element is part of an IS-IS advertisement (e.g., a TLV). The TLV element may directly or indirectly (e.g., via other network elements) be provided to the controller from the originating network element.

In some embodiments, the TLV element is a sub-TLV, and in some embodiments the TLV element is a "regular" TLV element.

In various embodiments, the TLV element could be carried by an OSPFv2 Router Information Opaque LSA 210, an OSPFv3 Router Information Opaque LSA 250, an OSPFv2 Extended Link TLV 308, an OSPFv2 Link TLV 330, an OSPFv3 Router-Link TLV 400, an IS-IS Router Capability TLV 506, an IS-IS "Type 22" Extended IS Reachability TLV 606A, an IS-IS "Type 23" IS Neighbor Attribute TLV 606B, a "Type 222" IS-IS Multi-Topology (MT) IS TLV 630A, and/or a "Type 223" IS-IS MT IS Neighbor Attribute TLV 630B.

At block 810, the flow 800 includes determining, based upon the MSD value, a path from the first network element to a second network element of the plurality of network elements for an identifiable set of traffic. The path can be represented by a set of one or more SID labels. The number of SID labels in the set of segment identifier labels is necessarily less than or equal to the MSD value received in block 805.

In some embodiments, block 810 includes performing a path-finding process using the received MSD value as a constraint such that any selected path will not have a corresponding number of SIDs that exceeds the MSD value. For example, in some embodiments, block 810 includes identifying a candidate set of paths, and eliminating from consideration one or more of the candidate paths based upon determining that the path would require a number of SIDs to be pushed into traffic (e.g., by the first network element) that exceeds the MSD value reported by the first network element.

In embodiments where the MSD value is a "link" MSD value for a first link of the first network element, block 805 may also include receiving one or more additional MSD values for one or more additional links of the first network element. In this case, the block 810 determination can be based upon one or more of these MSD values, such that the MSD capabilities of the various links can be considered when attempting to identify paths using those various links.

At block 815, the flow 800 includes sending, to the first network element, data for the path to be utilized by the network element for the forwarding of the received packets through the SR network. The data includes the set of SID labels to be pushed into received packets of the identifiable set of traffic.

Figure 8B:
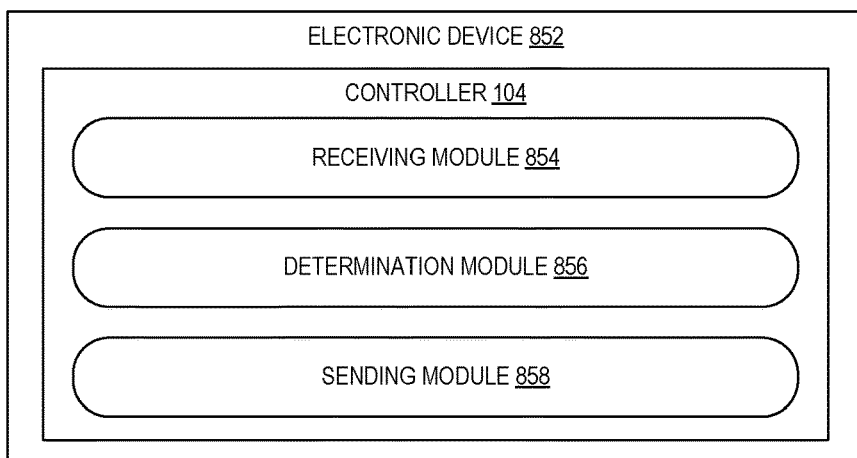
FIG. 8B illustrates a high-level block diagram of a controller that can perform the flow of FIG. 8A according to some embodiments.

FIG. 8B illustrates a high-level block diagram 850 of a controller 104, which can perform the flow 800 of FIG. 8A according to some embodiments.

It is not strictly necessary that each module depicted herein be implemented as physically separate units. Some or all modules may be combined in a physical unit. Also, the modules need not be implemented strictly in hardware. It is envisioned that the units may be implemented through a combination of hardware and software. For example, the electronic device 852 may include one or more central processing units executing program instructions stored in a non-transitory storage medium or in firmware to perform the functions of the modules.

The electronic device 852 can implement the controller 104, which can include a receiving module 854, determination module 856, and/or sending module 858.

The receiving module 854 can be adapted to receive, from a first network element of a plurality of network elements of a segment routing network, a TLV element including a MSD value that identifies a maximum number of SID labels that the first network element is able to push into packet headers of received packets to enable forwarding of the received packets through a SR network. The TLV element can be sent utilizing an OSPF protocol. In some embodiments, the receiving module 854 can perform block 805 of flow 800 of FIG. 8A.

The determination module 856 can be adapted to determine, based upon the MSD value, a path from the first network element to a second network element of the plurality of network elements for an identifiable set of traffic that includes a set of one or more SID labels, wherein a number of SID labels in the set of SID labels is less than or equal to the MSD value. In some embodiments, the determination module 856 can perform block 810 of flow 800 of FIG. 8A.

The sending module 858 can be adapted to send, to the first network element, data for the path to be utilized by the network element for the forwarding of the received packets through the SR network, where the data includes the set of SID labels to be pushed into received packets of the identifiable set of traffic. In some embodiments, the sending module 858 can perform block 815 of flow 800 of FIG. 8A.

In some embodiments, the controller 104 can include other non-illustrated modules to perform other operations as disclosed herein. Thus, the depicted embodiment is illustrative and not limiting.

As described herein, some embodiments utilize electronic devices. An electronic device can store and/or transmit (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, many electronic devices (e.g., a computer or "computing device") can include hardware and software, such as a set of one or more processors coupled to one or more machine-readable storage media to store code for execution on the set of processors and/or to store data.

For example, an electronic device can include non-volatile memory containing code, as non-volatile memory can persist code/data even when the electronic device is turned off (when power is removed). While the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Many electronic devices also include a set or one or more physical network interface(s) to establish network connections (to transmit and/or receive code and/or data using propagating signals) or otherwise communicate with other electronic devices. One or more parts of various embodiments described herein can be implemented using different combinations of software, firmware, and/or hardware.

A network device (ND) is an electronic device that communicatively interconnects other electronic devices (e.g., other network devices, end-user devices) in one or more networks. Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments. FIG. 9A shows NDs 900A-900H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F (and not illustrating as ending at a terminus) illustrates that these NDs act as ingress and egress points for the network and thus, these NDs are sometimes referred to as "edge" NDs while the other NDs may be called "core" NDs.

Two of the exemplary ND implementations in FIG. 9A are: 1) a special-purpose network device 902 that can include custom application—specific integrated—circuits (ASICs) and a special-purpose operating system (OS); and 2) a general-purpose network device 904 that can use common off-the-shelf (COTS) components (e.g., processors) and a potentially a "standard" OS.

The special-purpose network device 902 includes networking hardware 910 comprising compute resource(s) 912 (typically including a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920.

The networking software 920 can, in some embodiments, include MSD advertisement module code 990A useful for implementing an MSD advertisement module 933A that can perform operations disclosed herein, including the operations of flow 700 of FIG. 7A and discussed throughout this description. For example, MSD advertisement module 933A can comprise an instance of an OSPF and/or IS-IS routing engine configured to send MSD values as described herein. These MSD values can be determined based upon, for example, the capabilities of the physical network interfaces 916.

A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-900H.

During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), can form a (separate) virtual network element 930A-930R. Each of the virtual network element(s) (VNEs) 930A-930R includes a control communication and configuration module 932A-932R (sometimes referred to as a local control module or control communication module) and forwarding table(s) 934A-934R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

In some embodiments, one or more of the control communication and configuration modules (e.g., 932A) of the virtual network element(s) (VNEs) 930A-930R can include an MSD advertisement module 933A instantiated or implemented by the execution of the MSD advertisement module code 990A.

The special-purpose network device 902 is often physically and/or logically considered to include: 1) a ND control plane 924 (sometimes referred to as a control plane) comprising the compute resource(s) 912 that execute the control communication and configuration module(s) 932A-932R; and 2) a ND forwarding plane 926 (sometimes referred to as a forwarding plane, a data plane, or a media plane) comprising the forwarding resource(s) 914 that utilize the forwarding table(s) 934A-934R and the physical NIs 916. By way of example, where the ND is a router (or is implementing routing functionality), the ND control plane 924 (the compute resource(s) 912 executing the control communication and configuration module(s) 932A-932R) is typically responsible for participating in controlling how data (e.g., packets) is to be routed (e.g., the next hop for the data and the outgoing physical NI for that data) and storing that routing information in the forwarding table(s) 934A-934R, and the ND forwarding plane 926 is responsible for receiving that data on the physical NIs 916 and forwarding that data out the appropriate ones of the physical NIs 916 based on the forwarding table(s) 934A-934R.

FIG. 9B illustrates an exemplary way 937 to implement the special-purpose network device 902 according to some embodiments. FIG. 9B illustrates a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Within the context of embodiments disclosed herein, the cards 938 may potentially have different depths of SIDs that they can inject into traffic, and thus may have different MSD values. For example, in some common deployment scenarios, the cards 938 can include cards manufactured by different vendors, or include cards that are different models from a same manufacturer, and these cards 938 may have different SID injection capabilities.

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950.

The software 950 can include MSD advertisement module code 990B that can be executed by the processor(s) 942 to implement a MSD advertisement module (not illustrated), which may be part of application(s) 964A-964R, in order to perform the operations described herein (e.g., flow 700 of FIG. 7). Accordingly, this MSD advertisement module can advertise the MSD value of the "node" and/or "links," which can be determined based upon the capabilities of the NIC(s) 944, and can be advertised using an IGP such as OSPF or IS-IS.

During operation, the processor(s) 942 execute the software 950 to instantiate one or more sets of one or more applications 964A-964R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-962R called software containers that may each be used to execute one (or more) of the sets of applications 964A-964R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-964R is run on top of a guest operating system within an instance 962A-962R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-962R, or as a combination of unikernels and the above-described techniques (e.g., unikernels and virtual machines both run directly on a hypervisor, unikernels and sets of applications that are run in different software containers).

The instantiation of the one or more sets of one or more applications 964A-964R, as well as virtualization if implemented, are collectively referred to as software instance(s) 952. Each set of applications 964A-964R, corresponding virtualization construct (e.g., instance 962A-962R) if implemented, and that part of the hardware 940 that executes them (be it hardware dedicated to that execution and/or time slices of hardware temporally shared), forms a separate virtual network element(s) 960A-960R.

The virtual network element(s) 960A-960R perform similar functionality to the virtual network element(s) 930A-930R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-962R corresponding to one VNE 960A-960R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-962R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-962R and the NIC(s) 944, as well as optionally between the instances 962A-962R; in addition, this virtual switch may enforce network isolation between the VNEs 960A-960R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-930R, VNEs 960A-960R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 9C:
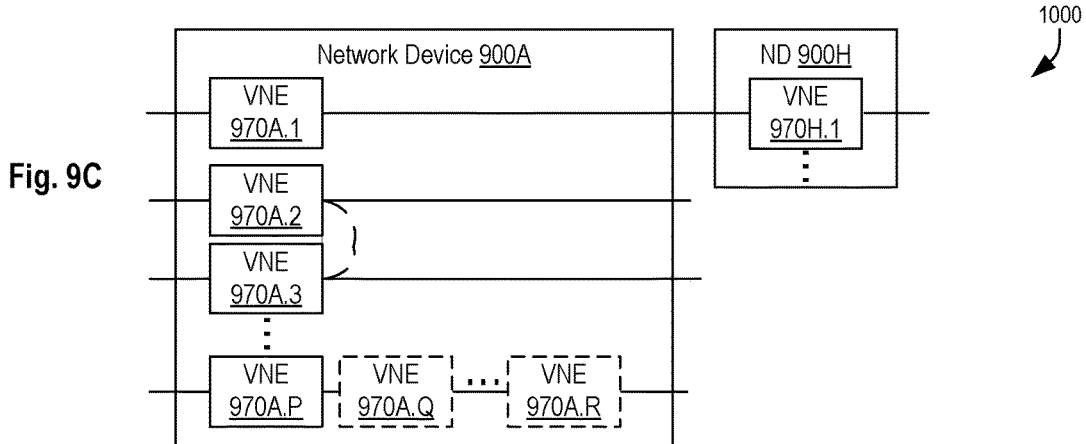
FIG. 9C illustrates various exemplary ways in which virtual network elements (VNEs) may be coupled according to some embodiments.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice over Internet Protocol (VoIP) phones, terminals, portable media players, Global Positioning System (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-962R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an IP network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an IETF MPLS or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., BGP/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
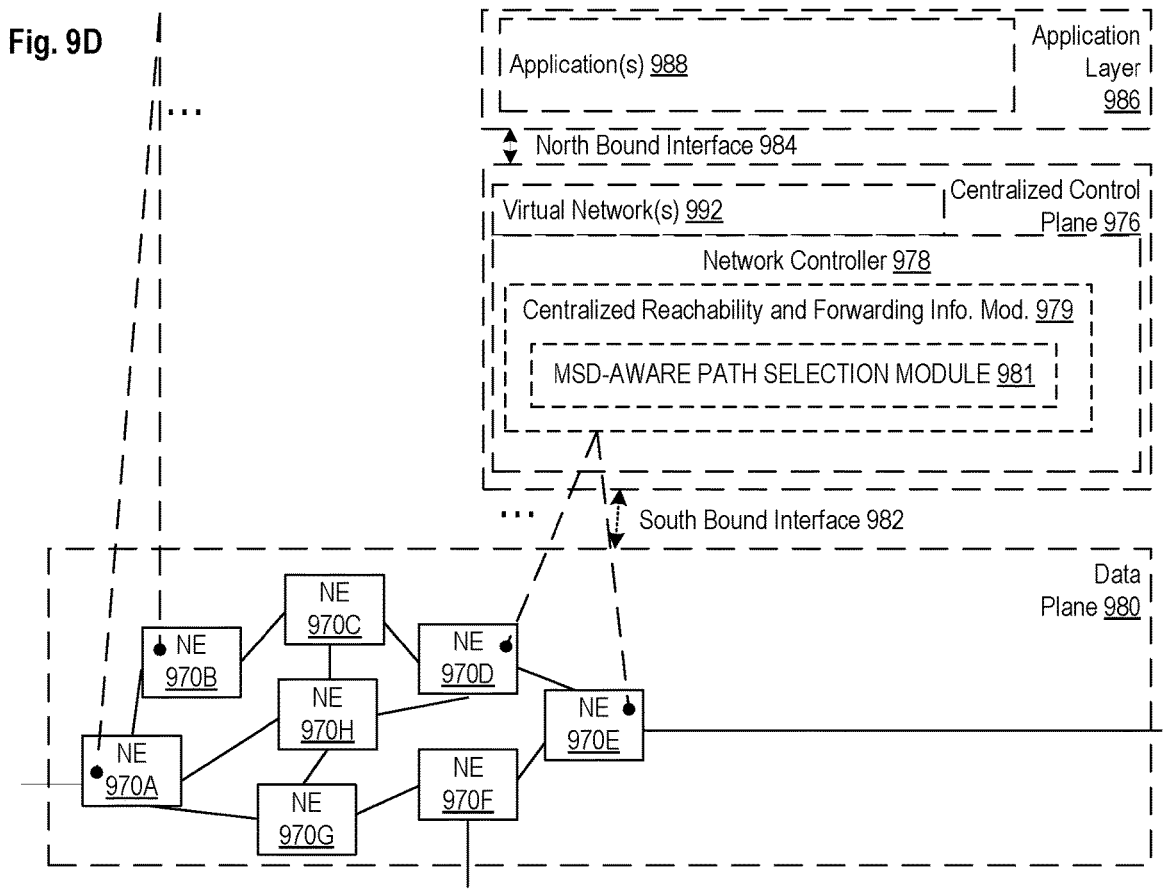
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-970H with the same connectivity as the NDs 900A-H of FIG. 9A.

FIG. 9D illustrates that the distributed approach 972 distributes responsibility for generating the reachability and forwarding information across the NEs 970A-970H; in other words, the process of neighbor discovery and topology discovery is distributed.

For example, where the special-purpose network device 902 is used, the control communication and configuration module(s) 932A-932R of the ND control plane 924 typically include a reachability and forwarding information module to implement one or more routing protocols (e.g., an exterior gateway protocol such as BGP, Interior Gateway Protocol(s) (IGP) (e.g., OSPF, IS-IS, Routing Information Protocol (RIP), LDP, Resource Reservation Protocol (RSVP) (including RSVP-TE: Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-970H (e.g., the compute resource(s) 912 executing the control communication and configuration module(s) 932A-932R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-934R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as SDN) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized.

The centralized control plane 976 has a south bound interface 982 with a data plane 980 (sometime referred to the infrastructure layer, network forwarding plane, or forwarding plane (which should not be confused with a ND forwarding plane)) that includes the NEs 970A-970H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-970H of the data plane 980 over the south bound interface 982 (which may use the OpenFlow protocol). Thus, the network intelligence is centralized in the centralized control plane 976 executing on electronic devices that are typically separate from the NDs.

In some embodiments, the centralized reachability and forwarding information module 979 includes an MSD-aware path selection module 981 that is operable to perform operations disclosed herein, such as the operations of flow 800 of FIG. 8A.

For example, where the special-purpose network device 902 is used in the data plane 980, each of the control communication and configuration module(s) 932A-932R of the ND control plane 924 typically include a control agent that provides the VNE side of the south bound interface 982. In this case, the ND control plane 924 (the compute resource(s) 912 executing the control communication and configuration module(s) 932A-932R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-932R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-960R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-960R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-970H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-970H, it should be understood that the network control approaches described with reference to FIG. 9D also work for networks where one or more of the NDs 900A-900H implement multiple VNEs (e.g., VNEs 930A-930R, VNEs 960A-960R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
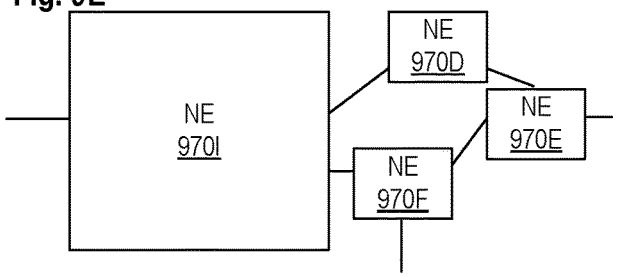
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9F:
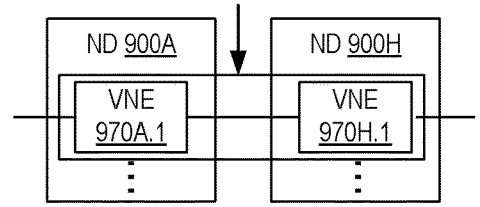
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-970H (see FIG. 9D), but the centralized control plane 976 has abstracted multiple of the NEs in different NDs (the NEs 970A-970C and 970G-970H) into (to represent) a single NE 9701 in one of the virtual network(s) 992 of FIG. 9D, according to some embodiments. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
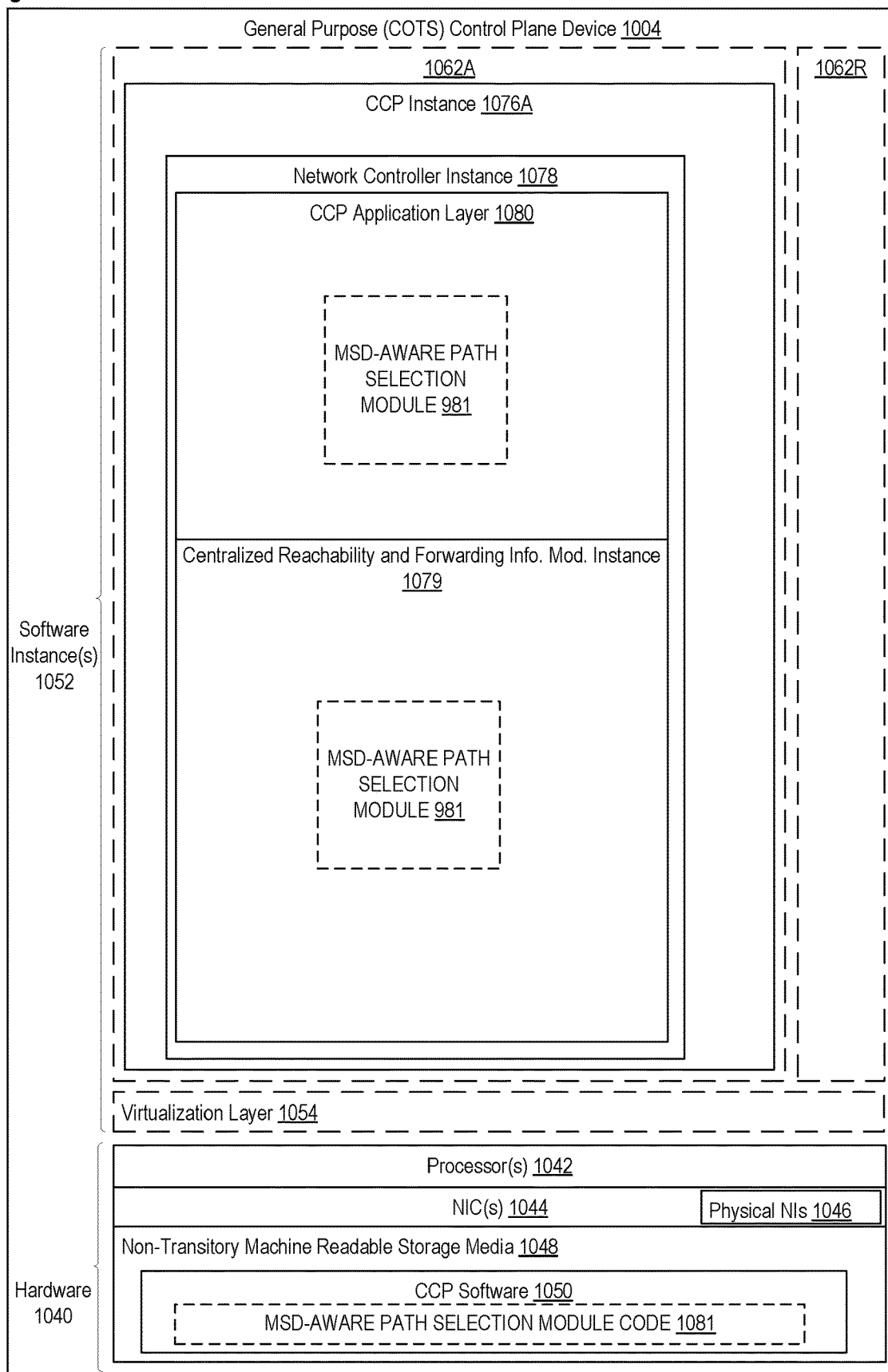
FIG. 10 illustrates a general purpose control plane device with centralized control plane (CCP) software), according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) include compute resource(s), a set or one or more physical NICs, and a non-transitory machine-readable storage medium having stored thereon the centralized control plane software. For instance, FIG. 10 illustrates a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In some embodiments, the CCP software 1050 includes MSD-aware path selection module code 1081 which, when executed by the processor(s) 1042, can provide a MSD-aware path selection module 981 component within the centralized reachability and forwarding information module instance 1079 and/or CCP application layer 1080, depending upon the particular implementation.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, ECMP (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multi-protocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a device implementing a network element in a Segment Routing (SR) network, comprising:
    transmitting, by the network element, a Type Length Value (TLV) element including a Maximum Segment Identifier Depth (MSD) value, wherein the TLV element was advertised using an Open Shortest Path First (OSPF) protocol, wherein the MSD value identifies a maximum number of segment identifier (SID) labels that the network element is able to push into packet headers of received packets to enable forwarding of the received packets through the SR network; and
    receiving, from a controller, data for a path to be utilized by the network element for forwarding the received packets through the SR network, wherein the data includes a set of one or more SID labels to be pushed into the received packets associated with the path, and wherein the set of SID labels has fewer than or equal to the MSD value number of SID labels, and
    wherein the controller and the network element do not utilize the Path Computation Element Protocol (PCEP) over a southbound interface.

2. The method of claim 1, wherein the OSPF protocol comprises either OSPF version 2 (OSPFv2) or OSPF version 3 (OSPFv3).

3. The method of claim 1, wherein the TLV element is a node MSD TLV and is carried by either:
    an OSPFv2 Router Information Opaque Link State Advertisement (LSA); or
    an OSPFv3 Router Information Opaque LSA.

4. The method of claim 1, wherein the TLV element is a link MSD sub-TLV and is carried by either:
    an OSPFv2 Extended Link Opaque Link State Advertisement (LSA);
    an OSPFv2 Traffic Engineering (TE) LSA; or
    an OSPVv3 E-Router-LSA.

5. The method of claim 1, further comprising:
    determining, by the network element, the MSD value as a smallest one of one or more MSD values of one or more line cards of the network element.

6. A method in a controller communicatively coupled with a plurality of network elements of a Segment Routing (SR) network, the method comprising:
    receiving, from a first network element of the plurality of network elements, a Type Length Value (TLV) element including a Maximum Segment Identifier Depth (MSD) value, wherein the TLV element was advertised using an Open Shortest Path First (OSPF) protocol, wherein the MSD value identifies a maximum number of segment identifier (SID) labels that the first network element is able to push into packet headers of received packets to enable forwarding of the received packets through the SR network;
    determining, based upon the MSD value, a path from the first network element to a second network element of the plurality of network elements for an identifiable set of traffic that utilizes a set of one or more SID labels, wherein a number of SID labels in the set of SID labels is less than or equal to the MSD value; and
    sending, to the first network element, data for the path to be utilized by the network element for the forwarding of the received packets through the SR network, wherein the data includes the set of SID labels to be pushed into received packets of the identifiable set of traffic,
    wherein the controller and the first network element do not utilize the Path Computation Element Protocol (PCEP) over a southbound interface.

7. The method of claim 6, wherein the OSPF protocol comprises either OSPF version 2 (OSPFv2) or OSPF version 3 (OSPFv3).

8. The method of claim 6, wherein the TLV element is a node MSD TLV and is carried by either:
    an OSPFv2 Router Information Opaque Link State Advertisement (LSA); or
    an OSPFv3 Router Information Opaque LSA.

9. The method of claim 6, wherein the TLV element is a link MSD sub-TLV and is carried by either:
    an OSPFv2 Extended Link Opaque Link State Advertisement (LSA);
    an OSPFv2 Traffic Engineering (TE) LSA; or
    an OSPVv3 E-Router-LSA.

10. A non-transitory computer-readable storage medium having instructions which, when executed by one or more processors of a device, cause the device to implement a network element to act in a Segment Routing (SR) network and perform operations comprising:
    transmitting a Type Length Value (TLV) element including a Maximum Segment Identifier Depth (MSD) value, wherein the TLV element was advertised using an Open Shortest Path First (OSPF) protocol, wherein the MSD value identifies a maximum number of segment identifier (SID) labels that the network element is able to push into packet headers of received packets to enable forwarding of the received packets through the SR network; and receiving, from a controller, data for a path to be utilized by the network element for forwarding the received packets through the SR network, wherein the data includes a set of one or more SID labels to be pushed into the received packets associated with the path, and wherein the set of SID labels has fewer than or equal to the MSD value number of SID labels, and wherein the controller and the network element do not utilize the Path Computation Element Protocol (PCEP) over a southbound interface.

11. The non-transitory computer-readable storage medium of claim 10, wherein the OSPF protocol comprises either OSPF version 2 (OSPFv2) or OSPF version 3 (OSPFv3).

12. The non-transitory computer-readable storage medium of claim 10, wherein the TLV element is a node MSD TLV and is carried by either:

an OSPFv2 Router Information Opaque Link State Advertisement (LSA); or an OSPFv3 Router Information Opaque LSA.

13. The non-transitory computer-readable storage medium of claim 10, wherein the TLV element is a link MSD sub-TLV and is carried by either:

an OSPFv2 Extended Link Opaque Link State Advertisement (LSA);

an OSPFv2 Traffic Engineering (TE) LSA; or an OSPVv3 E-Router-LSA.

14. The non-transitory computer-readable storage medium of claim 10, wherein the operations further comprise:

determining the MSD value as a smallest one of one or more MSD values of one or more line cards of the network element.

* * * * *